United States Patent
Khurana et al.

(10) Patent No.: US 10,594,700 B2
(45) Date of Patent: *Mar. 17, 2020

(54) SYSTEM OF DEMAND RESPONSE PROVIDER CONTROL OF NETWORK CONNECTED DEVICES

(71) Applicant: Ademco Inc., Golden Valley, MN (US)

(72) Inventors: Sorabh Khurana, Savage, MN (US); Ivo Kubita, Znojmo (CZ); Thomas Yang, Flushing, NY (US)

(73) Assignee: Ademco Inc., Golden Valley, MN (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/046,409

(22) Filed: Feb. 17, 2016

(65) Prior Publication Data
US 2016/0241538 A1    Aug. 18, 2016

Related U.S. Application Data

(60) Provisional application No. 62/117,430, filed on Feb. 17, 2015.

(51) Int. Cl.
| | |
|---|---|
| *H04L 29/06* | (2006.01) |
| *G06F 21/62* | (2013.01) |
| *H04L 29/08* | (2006.01) |

(52) U.S. Cl.
CPC ............ *H04L 63/102* (2013.01); *G06F 21/62* (2013.01); *H04L 63/08* (2013.01); *H04L 63/101* (2013.01); *H04L 67/18* (2013.01)

(58) Field of Classification Search
CPC ....... H04L 67/18; H04L 63/102; H04L 63/08; G06F 21/62
See application file for complete search history.

(56) References Cited

U.S. PATENT DOCUMENTS

| | | |
|---|---|---|
| 5,818,845 A | 10/1998 | Moura et al. |
| 7,624,432 B2 | 11/2009 | Wood |
| | (Continued) | |

FOREIGN PATENT DOCUMENTS

| | | |
|---|---|---|
| CN | 1893372 | 1/2007 |
| CN | 101641892 | 2/2010 |
| | (Continued) | |

OTHER PUBLICATIONS

The International Search Report and Written Opinion for PCT Application Serial No. pct/us2016/018348, dated Jun. 16, 2016.
The International Search Report and Written Opinion for PCT Application Serial No. pct/us2016/018360, dated Jun. 16, 2016.
(Continued)

*Primary Examiner* — Khalil Naghdali
(74) *Attorney, Agent, or Firm* — Shumaker & Sieffert, P.A.

(57) ABSTRACT

A system of controlling one or more building control devices. The system may incorporate receiving from a third party a request for access to a user account at a manufacturer of building control devices, where the user account may be associated with one or more of the user's building control devices from the manufacturer. The third party may be a demand response provider, an aggregator of building control devices, or a different entity. The building control devices may be connected to a network. The system may be implemented over one or more networks with a server, an application programming interface (API), and/or a service bus.

20 Claims, 22 Drawing Sheets

(56) References Cited

U.S. PATENT DOCUMENTS

| | | | |
|---|---|---|---|
| 7,908,645 B2* | 3/2011 | Varghese | G06Q 20/341 726/4 |
| 8,065,716 B2 | 11/2011 | Harwell | |
| 2009/0057424 A1* | 3/2009 | Sullivan | F24F 11/0009 236/51 |
| 2010/0324962 A1* | 12/2010 | Nesler | G01R 21/133 705/7.36 |
| 2012/0323393 A1* | 12/2012 | Imhof | G05B 15/02 700/297 |
| 2014/0031991 A1 | 1/2014 | Bergman et al. | |
| 2014/0330435 A1* | 11/2014 | Stoner | F24F 11/001 700/275 |
| 2015/0082396 A1* | 3/2015 | Theebaprakasam | H04L 63/08 726/5 |
| 2016/0055322 A1* | 2/2016 | Thomas | G06F 21/10 726/7 |
| 2016/0241538 A1 | 8/2016 | Khurana et al. | |
| 2017/0302641 A1* | 10/2017 | Ramatchandirane | H04L 63/0421 |

FOREIGN PATENT DOCUMENTS

| | | |
|---|---|---|
| CN | 101729553 | 6/2010 |
| CN | 103475713 | 12/2013 |
| CN | 103902373 | 7/2014 |
| CN | 107408188 | 11/2017 |

OTHER PUBLICATIONS

International Preliminary Report on Patentability from International Application No. PCT/US2016/018348, dated Aug. 22, 2017, 9 pp.
Prosecution History from U.S. Appl. No. 15/046,421, dated Oct. 18, 2017 through Sep. 3, 2019, 118 pp.
Notice of Allowance from U.S. Appl. No. 15/046,421, dated Nov. 1, 2019, 10 pp.
First Office Action and Search Report, and translation thereof, from counterpart Chinese Application No. 201680022243.2, dated Dec. 26, 2019, 25 pp.
First Office Action and Search Report, and translation thereof, from counterpart Chinese Application No. 201680016004.6, dated Dec. 3, 2019, 34 pp.

* cited by examiner

SYSTEM OF DEMAND RESPONSE PROVIDER CONTROL OF NETWORK CONNECTED DEVICES

This application claims the benefit of U.S. Provisional Application No. 62/117,430 filed Feb. 17, 2015. U.S. Provisional Application No. 62/117,430 filed Feb. 17, 2015, is hereby incorporated by reference.

BACKGROUND

The present disclosure pertains to controlling network connected devices and particularly to third-party control of network connected devices.

SUMMARY

The disclosure reveals systems for demand response program control of one or more building control devices incorporating a server of a first entity, where the server may have a processor and memory in communication with the processor. The memory may store a user device database. The server may be configured to receive a request from a second entity for access to a user account stored in the user device database. The request may be initiated by a user associated with the user account in the user device database. The server may authenticate the user as being associated with the user account and grant access to the user account. Further, the server may send user account information to the demand response provider and allow control of one or more devices associated with the user account via the demand response provider.

DESCRIPTION

Figure 1:
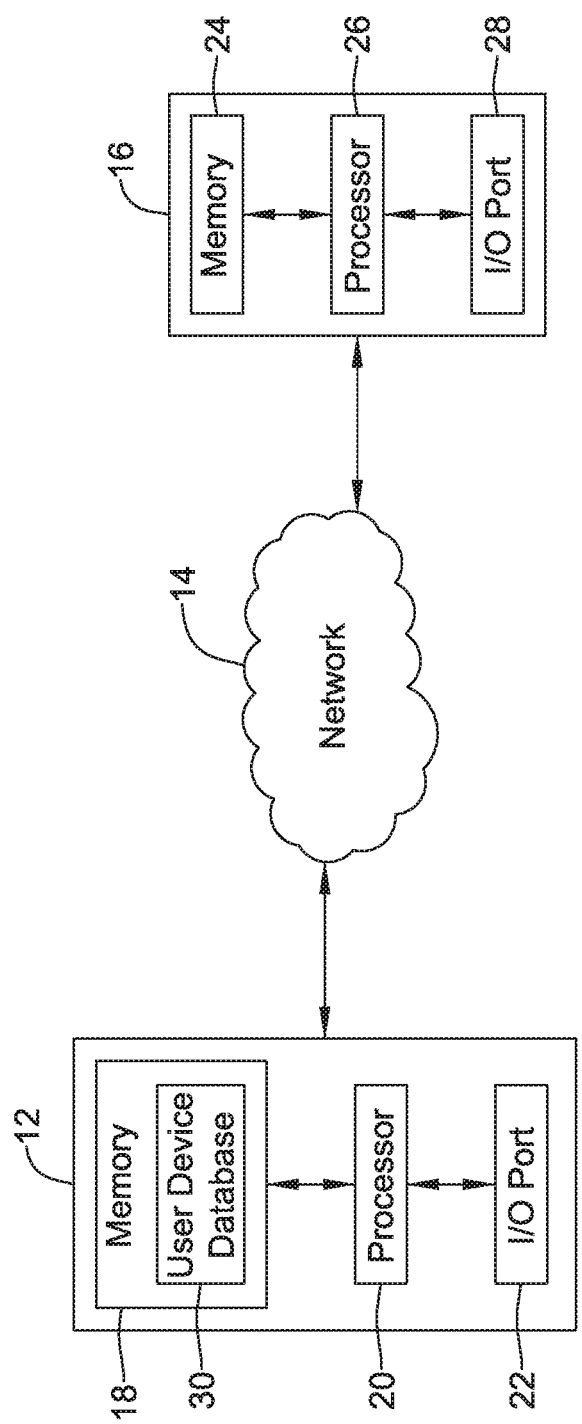
FIG. 1 is a schematic diagram of an illustrative example of a network connected device.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The internet of things is a network of physical objects that may be connected via one or more networks to allow the objects to collect and exchange information and/or data. A market of the internet of things may be rapidly growing and increasing traffic from the number of connected devices may present one or more challenges (e.g., technical challenges or other challenges) to service platforms for the internet of things. In some cases cloud system infrastructure may be leveraged to provide scalability, reliability, and/or security necessary to facilitate the collection and/or delivery of large amounts of information and/or data (e.g., messages). In one example, delivering real-time push data from the internet of things devices around the world to designated cloud systems for processing may be a difficult task to accomplish. It may be necessary to base architecture of such of internet of things service platforms on rock solid infrastructure with modular building blocks to easily scale out as a number of connected devices increases (e.g., as a number of things on the internet of things increases).

Users of network connected devices may have a user account with the manufacturer of one or more of their network connected devices. As such, in some cases, users may want to consolidate control of one or more of their network devices in a single interface (e.g., a single interface of an application programming code) that is not necessarily associated with one or more manufactures of the user's network connected devices (e.g., an interface from a third party (e.g., where a third party may be an entity other than the user and a manufacturer of a network connected device)).

When using an interface from a third party, the third party or the manufacturer of a network connected device may require all devices associated with a user account for a manufacturer to be at least initially controllable by the interface of the third party. Users, however, may not want all of their devices (e.g., network connected devices and other devices) associated with a user account of a manufacturer or other entity to be controllable by the interface of the third party. This may be so for one or more reasons including, but not limited to, billing purposes, home automation solution may be location specific, conflicts with other interfaces that are able to control a device, and so forth.

A solution to the issue of having to associate all devices connected to a user account of a manufacturer to an interface of a third party may be to allow users to select which devices to add to third party interfaces. To facilitate adding individual devices to a third party interface, the third party may be required to provide confirmation to the manufacturer that a device was added to a third party interface. The ability to add individual devices associated with a user's account with a manufacturer may help the manufacturer and/or user manage a network connected device (e.g., home automation device) control conflicts as more and more device and controls interact, allow for billing at an individual device level rather than a user account level, audit by a manufacturer from which third-party interface a control action is taken, increase data privacy due to account information being selectively exposed to a third party rather than entirely exposed when an account is added to the third-party interface, and so on.

As used herein, an example user account with a manufacturer of a network connected device may be a user account with Honeywell International Inc.'s My Total Connect Comfort™ portal, which may be accessed through an internet webpage, a mobile application (e.g., an interface of an application program code), and/or accessed in one or more other manners. An example of an interface of a third party may include the Wink application by Wink, Inc. and/or one or more other internet portals (e.g., mobile applications, webpages, and so on). Other examples of user accounts with a manufacturer and other examples of interfaces of third parties are contemplated.

As an alternative to, in addition to, or as a subset of interfaces of third party for controlling and/or monitoring a network connected device, users may utilize demand response providers to at least partially control one or more network connected device. Some manufacturers may require users having user accounts with the manufacturer to utilize a particular demand response provider for enrolling one or more network connected devices into a demand response program. As a result, some users may choose to use other manufacturer devices and/or use accounts through third-parties that may allow for more choice when selecting a demand response provider. Thus, it may be desirable for a manufacturer to allow a user having a user account with the manufacturer to choose a desired demand response provider while maintaining an account with the manufacturer.

One issue with allowing a user to utilize a demand response provider of their choice may be security related. However, a framework has been developed that may allow users with user accounts with a manufacturer to subscribe to a program of a demand response provider of choice using existing authentication infrastructure (e.g., by using oAuth or other infrastructure used for authorizing users to log into third-party websites using existing accounts without exposing passwords to the third-parties). oAuth may be an authentication protocol that may allow users to approve an entity to act on their behalf without sharing their password with that entity.

Once a user has paired a network device (e.g., a building automation device such as a thermostat, humidifier, smoke detector, and so forth) with a demand response provider, the demand response provider may utilize a server to server flow (e.g., via oAuth) to issue demand response commands to one or more thermostats paired/subscribed with the demand response provider/to a demand response program. Such a configuration may allow for a manufacturer to ensure a network connected device is subscribed to a single demand response provider, allow demand response providers to determine locations of network connected devices and/or demand response capabilities before confirming a subscription to a demand response program, and/or allow a manufacturer to identify demand response subscriptions at a device level rather than at a user account or location level.

To facilitate moving data and/or information to and/or from network connected device, manufacturers of network connected devices, demand response providers, and/or third parties (e.g., which may include demand response providers), a remote server bus may be utilized. In one example, a remote server bus may be one offered through Microsoft™ cloud services, such as the Azure Service Bus. This is not necessarily required and other services buses may be utilized, as desired.

A service bus may be configured as a generic, cloud-based (e.g., remotely accessed through a network) messaging system for delivering data and/or information (e.g., including messages) to and/or from network based applications, servers, and/or devices irrespective of a geographical location of the applications, servers, and/or devices as long as they are connected or connectable to the network. For example, a service bus may be configured to connect various applications to one another from a data sharing and/or a messaging perspective, may be configured to connect household appliances, sensors and/or other devices like tables or phones to one another and/or to a central application, and/or may be configured to connect one or more other devices and/or systems to one another.

Utilization of a service bus by a manufacturer may facilitate real-time control and/or access to network connected devices. For example, using a service bus to transfer data and/or information to third parties and demand response providers may facilitate developing services that may be offered to users with a network connected device, while allowing a manufacture of the network connected device to maintain a quality level of services offered for a device by setting rules for services, at least partially maintain control over data and/or information from its network connected devices, and/or provide desired control of network connected devices.

The service bus configuration may allow for scalability of the number of third parties or demand response providers with which a manufacturer may allow its devices to interact. For example, third parties may be given access to a manufacturer account with a service bus as those third parties become partners of the manufacturer.

Turning to the Figures, FIG. 1 depicts an illustrative example of a portion of the internet of things, which may include a server 12 connected via a network 14 to one or more network connected devices 16. Network connected devices may include, but are not limited to, building automation devices (e.g., thermostats, humidifiers, lighting system components, security system components, HVAC system components, etc.) and/or any internet connectable computing device.

One or more network connected devices 16 of a user may be associated with a user account of the user. The user account of a user may be stored in a user device database 30 stored on the server 12. In one example, the user account may be with a manufacturer of some or all of a user's network connected devices 16 that are associated with the user account. In such instances, the manufacturer may maintain operational control over the server 12.

A user may have one or more network connected devices 16, if any, associated with its user account. Such devices 16 may be located at a single geographical location (e.g., at a house, at a building, at a unit of a building) or one or more network connected devices 16 may be located at a geographical location separate from a geographical location of at least one other network connected device 16 associated with the user's user account.

The server 12 may include a memory 18, a processor 20 configured to communicate with the memory 18 and execute instructions stored on the memory 18, and an input/output (I/O) port 22 in communication with the processor 20 and/or the memory 18. One or more of the network connected devices 16 may include a memory 24, a processor 26 configured to communicate with the memory 24 and execute instructions stored on the memory 24, and an I/O port 28 in communication with the processor 26 and/or the memory 24.

In some cases, the server 12 and/or third party applications may include an application programming interface (API) or other program code through which the third-party applications (e.g., application programs) may interact with the server 12. The API or other program code may be stored in the memory 18 or other memory for execution by the server 12 and/or a remote computing device (e.g., a mobile device or wireless device). The API may facilitate the communication discussed below between various computing devices.

The memory 18, 24 may be any type of memory and/or include any combination of types of memory, as desired. In one example, the memory 18, 24 may include one or more of random access memory (RAM), read only memory (ROM), non-volatile memory (e.g., FLASH or other non-volatile memory), removable memory (e.g., a USB drive or other removable drive), and so on.

The I/O ports 22, 28 may be any type of communication port(s) and may facilitate wired and/or wireless communication with the network 14. For example, the I/O ports 22, 28 may facilitate communication with the network 14 and/or other devices (e.g., other network connected devices 16, mobile devices, server 12 and/or other devices) through any suitable connection including, but not limited to, radio communication, Ethernet, cellular communication, ZigBee, REDLINK™, Bluetooth, Bluetooth Low Energy (BLE), WiFi, IrDA, dedicated short range communication (DSRC), EnOcean, Near Field Communication (NFC), and/or any other suitable common or proprietary wired or wireless protocol.

The network 14 may include one or more networks and may include one or more types of networks. Illustratively, the network 14 may include a local area network (LAN), a wide area network (WAN), and/or one or more other networks connecting two or more computing devices. Although numerous networks 14 may be disclosed as connecting two or more computing devices, these networks 14 may be a single network or several networks.

Figure 2:
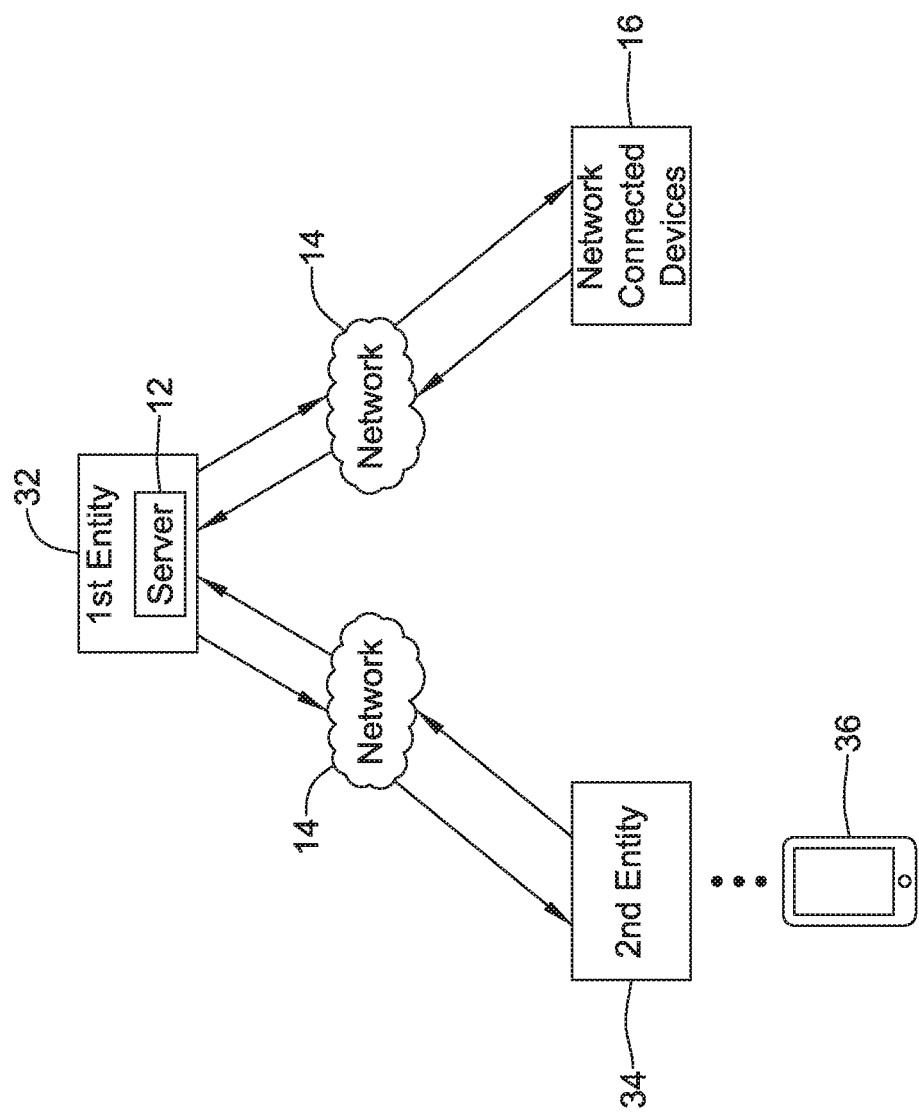
FIG. 2 is a schematic diagram of an illustrative example system incorporating communication with a second entity and network connected devices.

FIG. 2 depicts a system for controlling access to one or more network connected devices 16. As depicted in FIG. 2, the server 12 may be located at a first entity 32. The first entity may be a manufacturer of one or more of the building control devices 16 in communication with the first entity 32 over the network 14 or a different entity associated with one or more of the building control devices 16.

In addition to being in communication with the network connected devices 16, the first entity 32 may be in communication with a second entity 34 over the network 14 (e.g., a third party). As discussed in greater detail below, a user having a user account with the first entity may interact with its network connected devices 16 through the first entity 32 via the second entity 34. In one example, a user may interact with the second entity 34 through an interface of an application (e.g., an application program code) stored on a mobile devices 36 (e.g., a wireless device). In addition to, or as an alternative to, interacting with the second entity 34 through an interface of an application, a user may interact with the second entity 34 through a website via a computing device (e.g., a laptop, a personal computer, a personal digital assistant, a tablet computer, mobile phone, and so forth), in person, over a telephone, through the mail, and/or one or more other manners.

The second entity 34 may be any type of entity. In one example, the second entity 34 may be a third-party (e.g., not the user and not the manufacturer of all of the network connected devices 16) that may aggregate network connected devices through an application program code to allow users to view and/or control their network connected devices 16 from one or more manufacturers (e.g., first entities 32) through a single interface. Additionally or alternatively, the second entity 34 may be a demand response provider or other entity.

Figure 3:
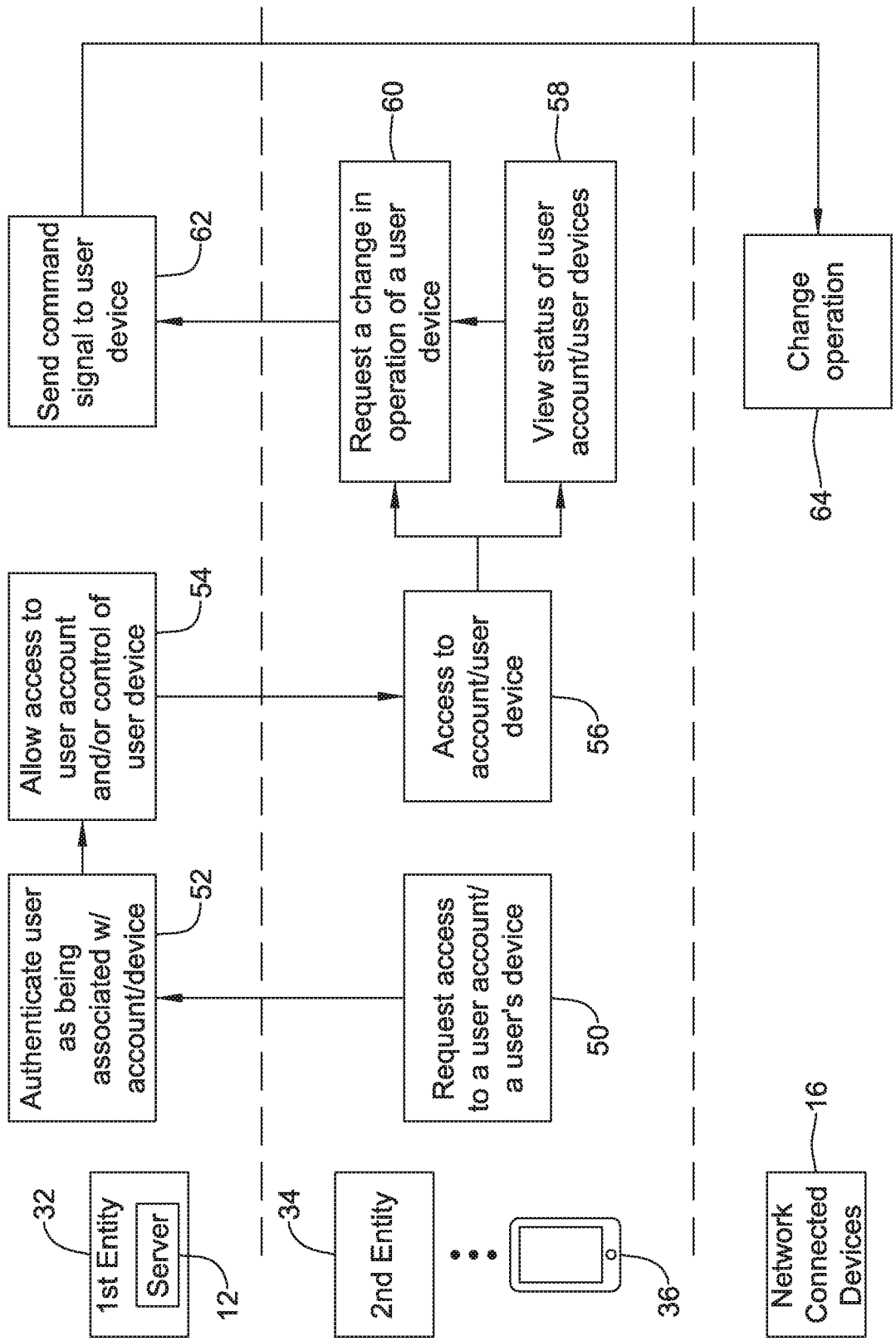
FIG. 3 is a schematic diagram of an illustrative example of communication over the system of FIG. 2.

FIG. 3 depicts an illustrative example flow between the first entity 32, the second entity 34 (e.g., via a mobile device 36), and the automation devices or network connected devices 16. At box 50, a user may interact with an application of the second entity 34 through the mobile device 36 to send a request from the second entity 34 to the first entity 32 (e.g., where the request may be received at server 12). The request may include a request for access to the user's user account stored in the user device database 30 of the first entity 32. With the request for user account access, the request may include user identifying information. User identifiable information may include, but may not be limited to, one or more of a personal identification number (PIN), a user name, a password, biometric information (e.g., finger print, facial recognition, retina scan), and other user identifiable information.

At box 52 in FIG. 3, the first entity 32 may use (e.g., manually or through computing instructions saved in servers 12) the user identifiable information to authenticate the user sending the request from the second entity 34 is associated with the requested user account and/or requested network connected devices 16. Once a user has been authenticated (e.g., the first entity confirms a username and password match an account saved on the user device database 30), at box 54 the first entity 32 may allow access to the user account and/or control of network connected devices 16 associated with the user or the user's user account, where control of network connected devices may be effected through interactions with the second entity 34. With and/or after allowing access to the user account and/or control network connected devices 16, the first entity 32 may send user account information from server 12 to the second entity 34.

At box 56 in FIG. 3, the second entity 34 may indicate (e.g., through an application on a mobile device 36, through a website, or through another mechanism) to a user that access to the user account and/or one or more user devices through the second entity 34 has been granted and/or approved by the first entity 32. Once access to a user account/user network connected devices 16 has been granted, the user may view a status of the user account/user network connected devices at box 58.

At box 60, a user may request a change in operation and/or setting of one or more of a user's network connected devices 16 through interacting with an application interface or other interface of the second entity 34. Once a change request has been received at the first entity 32 from the second entity 34, the first entity 32 may translate the request into a command signal and send the command signal at box 62 to the one or more network connected devices 16 to change an operation and/or setting of the devices 16 at box 64. In some cases, prior to sending the command signal at box 62 to the network connected devices 16, the first entity 32 may confirm no other third party is controlling the network connected device 16 and/or the network connected device 16 has not received a change in operation command from a source other than the second entity 34 (e.g., at the network connected device or through a different third party) within a predetermined amount of time. Such a check or audit may implement conflict control rules stored at the first entity 32 to ensure the network connected devices 16 do not receive conflicting commands.

FIGS. 4A-4H depict various screens 70 of an application interface for an application program code of a second entity 34. In some cases, the screens 70 depicted in the Figures and other screens of the application program code of the second entity 34 may be accessible through the mobile device 36 or other computing device (e.g., laptop, PC, and so on). The mobile devices 36 may have a speaker 74, a home or back button 76, and, optionally, a touch-sensitive display.

Figure 4A:
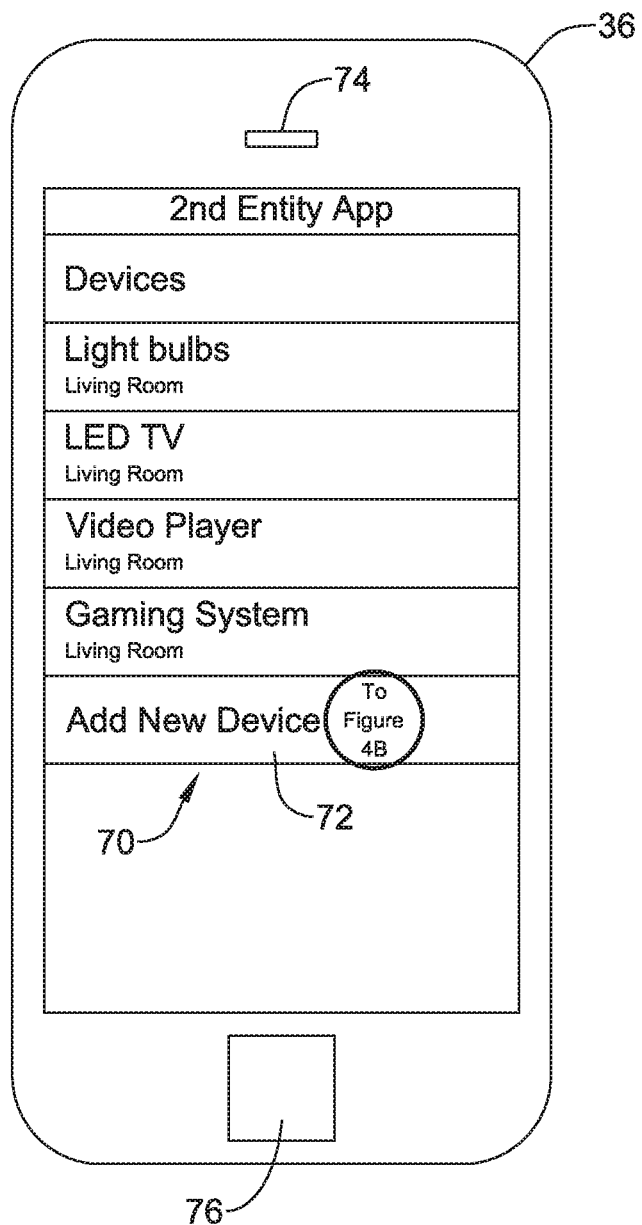
FIGS. 4A-4H are schematic diagrams of an illustrative example of interacting with a wireless device over the system of FIG. 2.

The screen 70 of FIG. 4A displays a list of the user's network connected devices 16 that have been associated with the second entity 34 or to which the second entity has been granted access for monitoring and/or controlling. In the example depicted in FIG. 4A, the listed network connected devices may include light bulbs in the user's living room, an LED (liquid emitting diode) TV in the living room, a video player (e.g., a Blu-Ray player) in the living room, and a gaming system in the living room. Additionally, or alternatively (e.g., when no network connected devices 16 of the user have been associated with the second entity 34), the screen 70 may include an ADD NEW DEVICE button 72 (e.g., where a button may include a touch sensitive area of a screen 70 or other button feature). When a user desires to add a new network connected device 16 with which to interact through the second entity 34, the user may press or select the ADD NEW DEVICE button 72 to initiate a new network connected device 16 to the devices monitored and/or controlled through the second entity 34.

Figure 4B:
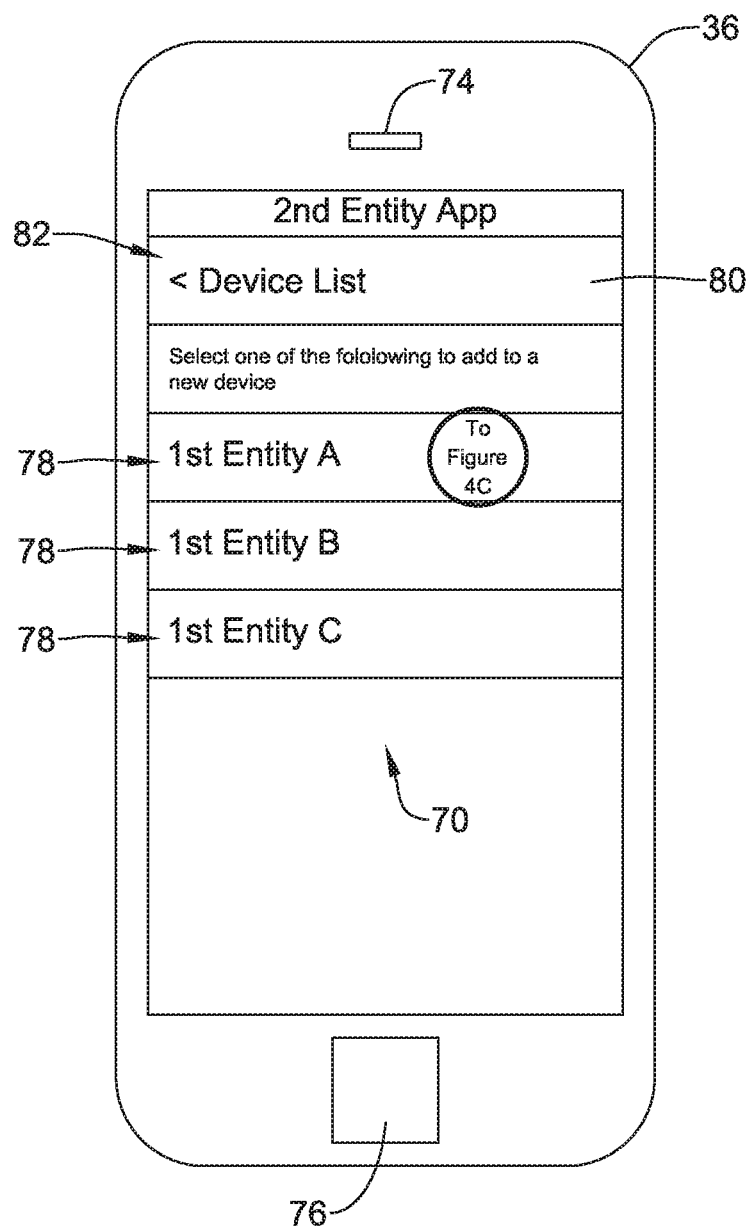
Figure 4C:
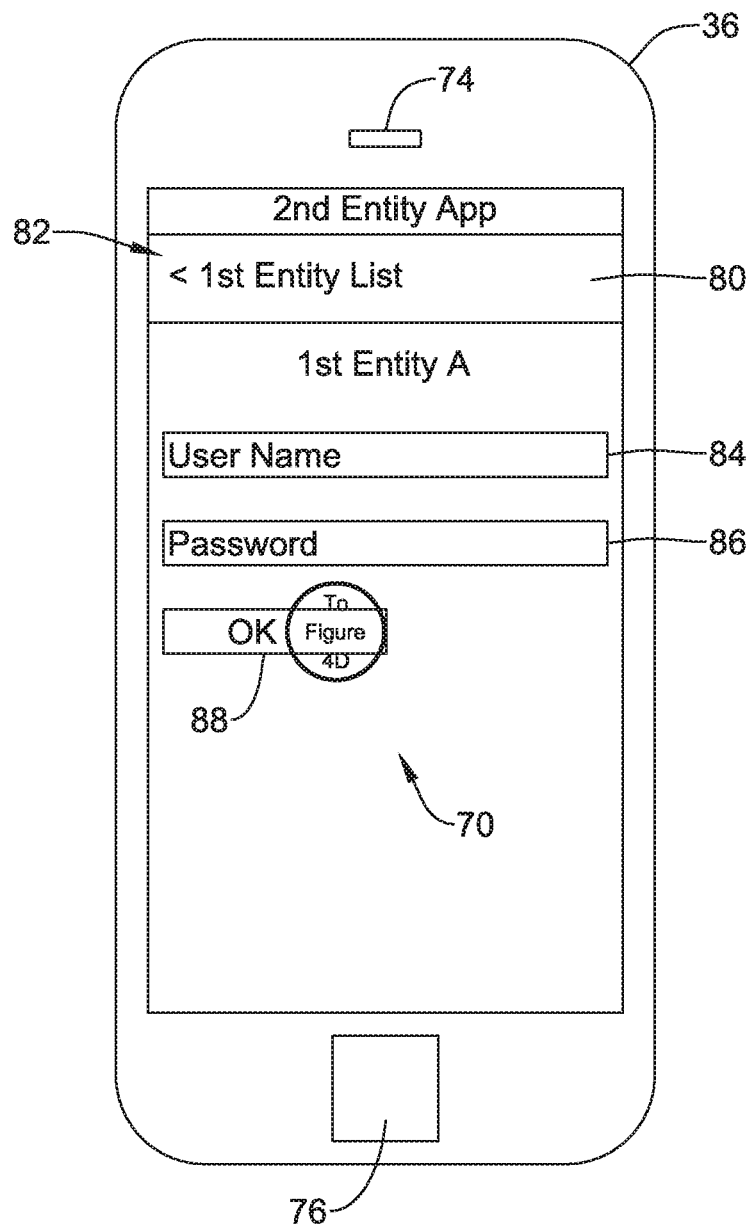

The screen 70 of FIG. 4B depicts an illustrative initial step in associating a network connected device 16 with the second entity 34. The screen 70 of FIG. 4B may include a list of first entities 32 (e.g., manufacturers of network connected devices and/or manufacturers that may partner with the second entity 34) with which a user may have a user account for its network connected devices 16. The displayed first entities 32 may include entities that manufacture or sell network connected devices 16 and/or may include a different type of entity having control over data from network connected devices 16. Each first entity 32 listed (e.g., First Entity—A, First Entity—B, and First Entity—C) may be a button 78 selectable by a user. In some cases, the screen 70 may include a back button 80 that may include a label area 82 indicating what screen will be displayed if the back button 80 is selected. To select a first entity 32 and go to the next screen 70, a user may select a button 78, for example, of First Entity—A.

The next screen 70 is from the first entity 32 (e.g., First Entity—A) and requests user authentication information from a user for the purpose of authenticating the user as being associated with a user account for which access may be requested. In the example screen 70 depicted in FIG. 4C, there may be a user name box 84 in which a user may enter a user name for its user account with the first entity 32 and a password box 86 for entering a password associated with the entered user name. Authentication may be performed through oAuth servers or through other authentication systems. Additionally, or alternatively, other user identifiable information may be entered as requested and/or desired. Once a user's user identifiable information has been entered, a user may select an ENTER or OK button 88 or other button, to send the user's user identifiable information (e.g., credentials) to the first entity 32 for authentication.

Figure 4D:
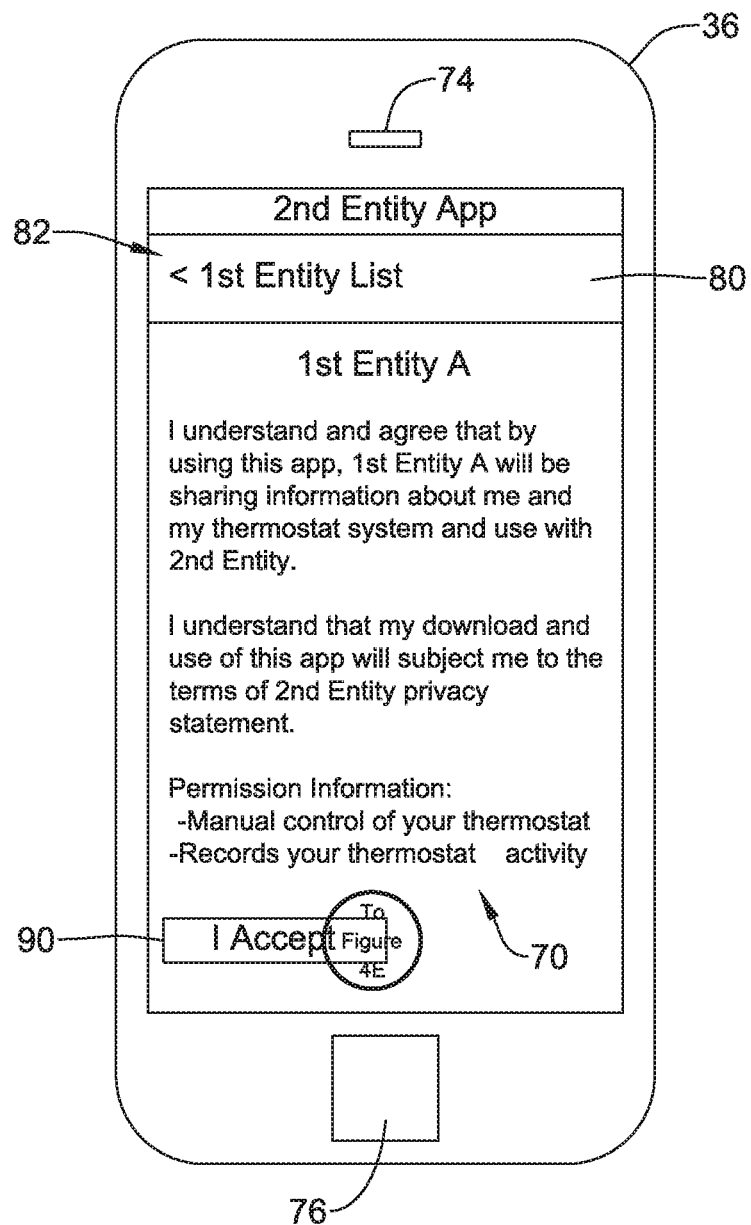

Then, the application program of the second entity 34 may display a further screen 70 depicting a use agreement or license agreement (e.g., an end-user license agreement (EULA)) from the first entity 32, as shown in FIG. 4D. If the screen 70 is larger than the display of the mobile device 36, the screen 70 may be scrollable and/or include indicators that there may be further information not currently displayed on the display. If the user agrees with the terms of the license, the user may select an I ACCEPT button 90 to move to the next screen 70.

After accepting the license, if any, and the first entity 32 approves access to the user account of the first entity 32, the first entity 32 may send user account information to the second entity, where the user account information may include a list of the network connected devices 16 associated with the user account of the first entity 32. The screens 70 depicted in FIGS. 4E and 4F include lists of a user's network connected devices 16 that may be associated with a user account of the first entity 32. What is depicted on the screens 70 of FIGS. 4E and 4F (like that area of FIG. 4E) may be limited based on application programming interfaces (APIs) associated with a user's account.

Figure 4E:
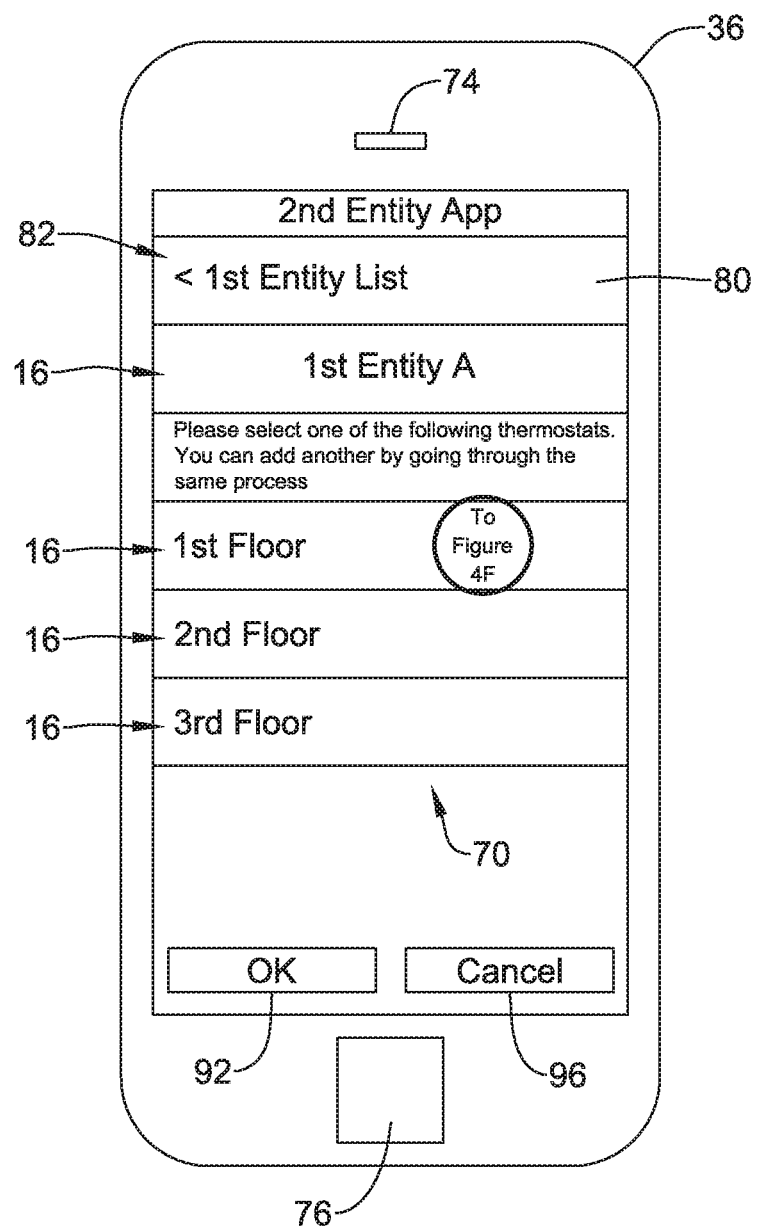
Figure 4F:
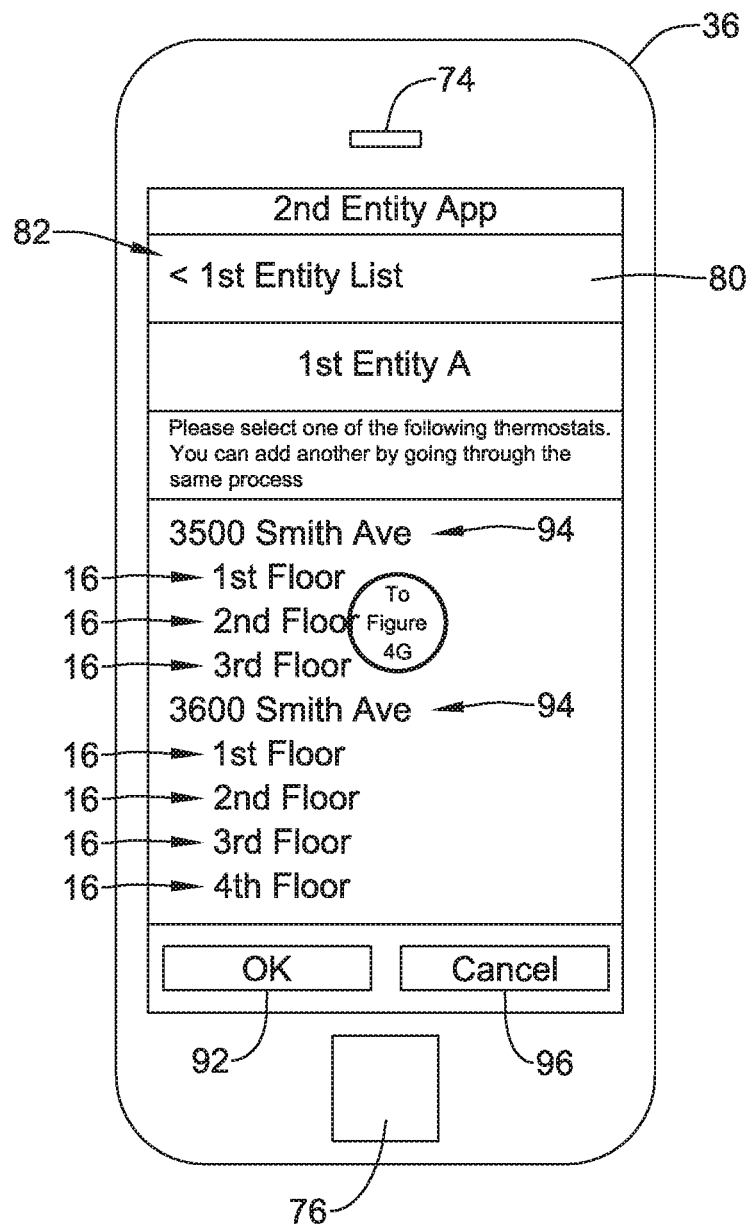

Screen 70 in FIG. 4E depicts network connected devices 16 of a user's that may be located at a single geographical location (e.g., a house, a building, a unit in a building, and so on). The screen 70 depicted in FIG. 4F shows network connected devices 16 grouped by geographical locations 94. The screens 70 of FIGS. 4E and 4F may be alternative screens or the screen of FIG. 4E may be displayed after selecting a geographical location of a user's network connected devices 16. From the screens 70 displaying a user's user connected devices 16, a user may select one or more network connected devices (e.g., selected network connected devices 16 may have a check mark next to it and/or may have other markings to indicate it has been selected) to associate with the second entity 34. Once a user has selected the desired network connected devices 16, the user may press or select an OK button 92 to move onto the next screen 70 and submit a request to grant the second entity 34 access to the selected network connected devices 16 of the user account of the first entity 32, where the server 12 of the first entity 32 may receive the request. If a user decides not to add one or more network connected devices 16 from the selected first entity 32, the user may press or select a CANCEL button 96.

Figure 4G:
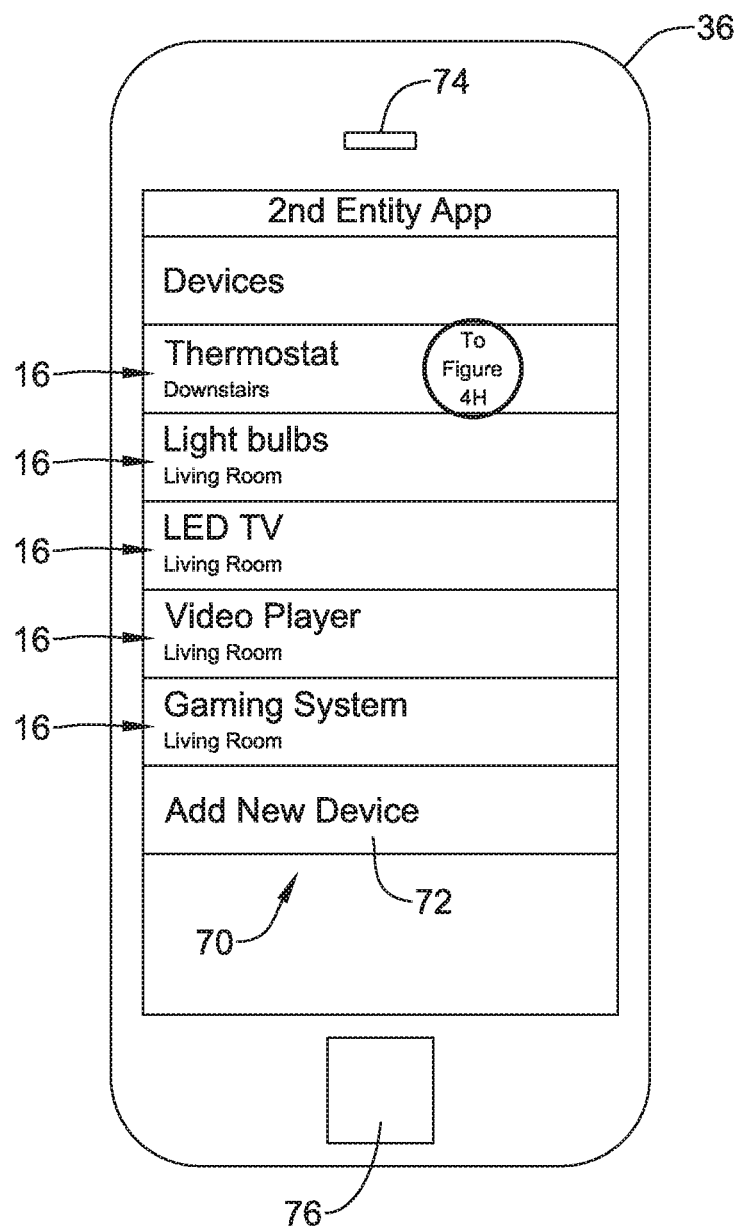
Figure 4H:
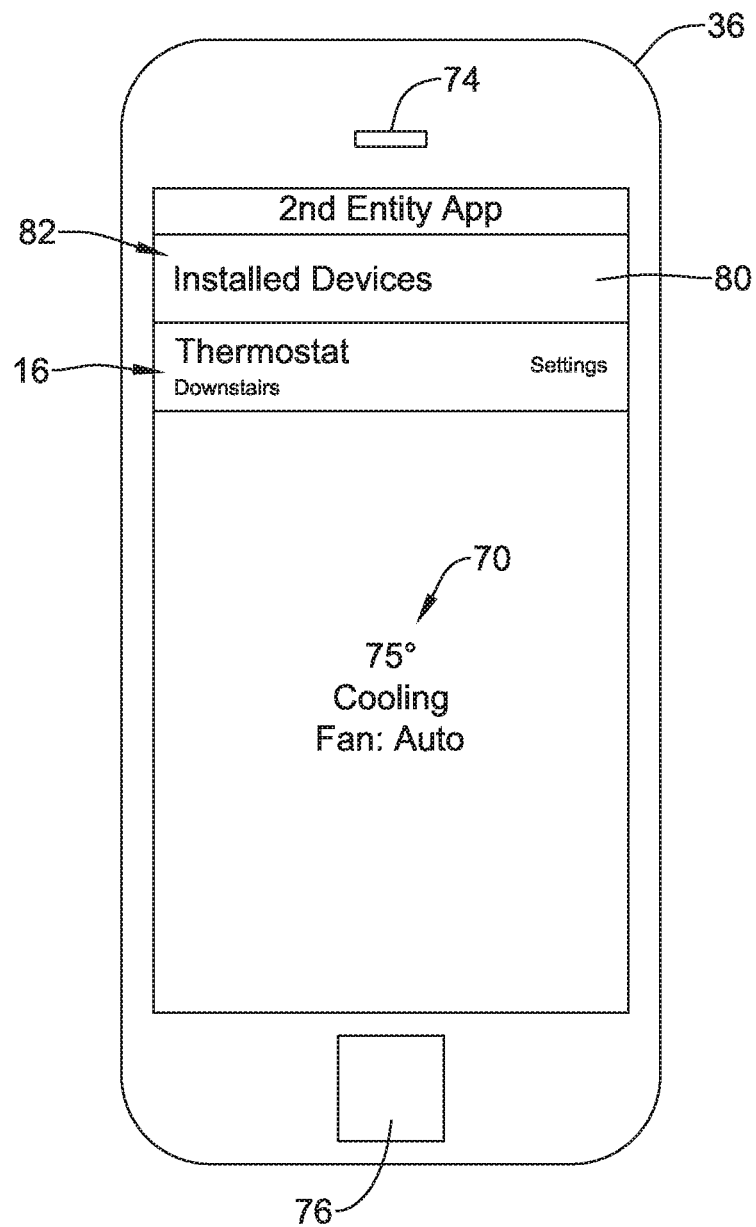

Once a request for access to one or more devices 16 is submitted and the request for access is granted, a user may view and/or control the devices 16 through the second entity 34. As shown in FIG. 4G, the added device 16 (e.g., a thermostat downstairs) may be shown in screen 70 of the application program code from the second entity. From the screen 70 in FIG. 4G, a user may select a device 16 (e.g., the thermostat) of which to view a current status, as shown in FIG. 4H. Although not shown, from the screen of the selected network connected device 16, a user may be able to control an operation of the selected network connected device 16 (e.g., change a set point of the network connected device 16).

Once a second entity 34 has been granted access to a network connected device 16, a user may want to delete or remove the network connected device 16 from second entity 34. In some cases, the network connected devices 16 associated with the second entity 34 may be deleted from the second entity 34 through interacting with an interface of the second entity 34 and/or through interacting with an interface of the first entity.

Figure 5A:
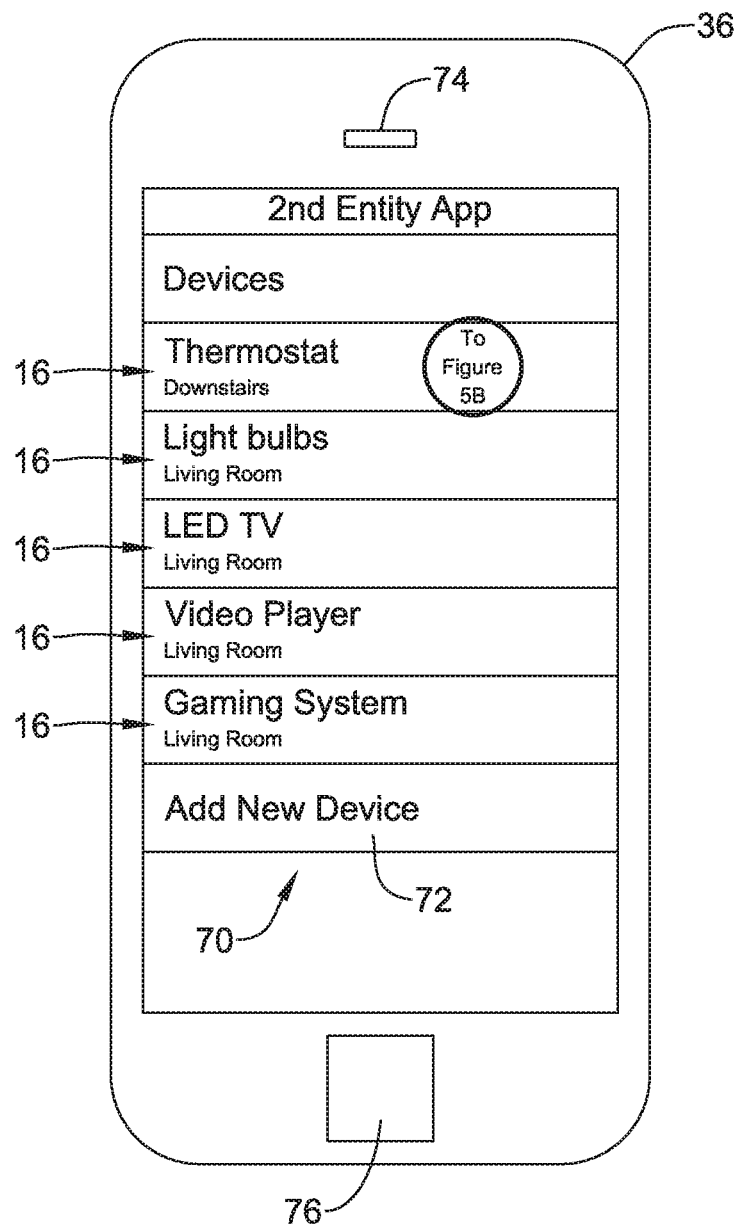
FIGS. 5A-5C are schematic diagrams of an illustrative example of interacting with a wireless device over the system of FIG. 2.
Figure 5B:
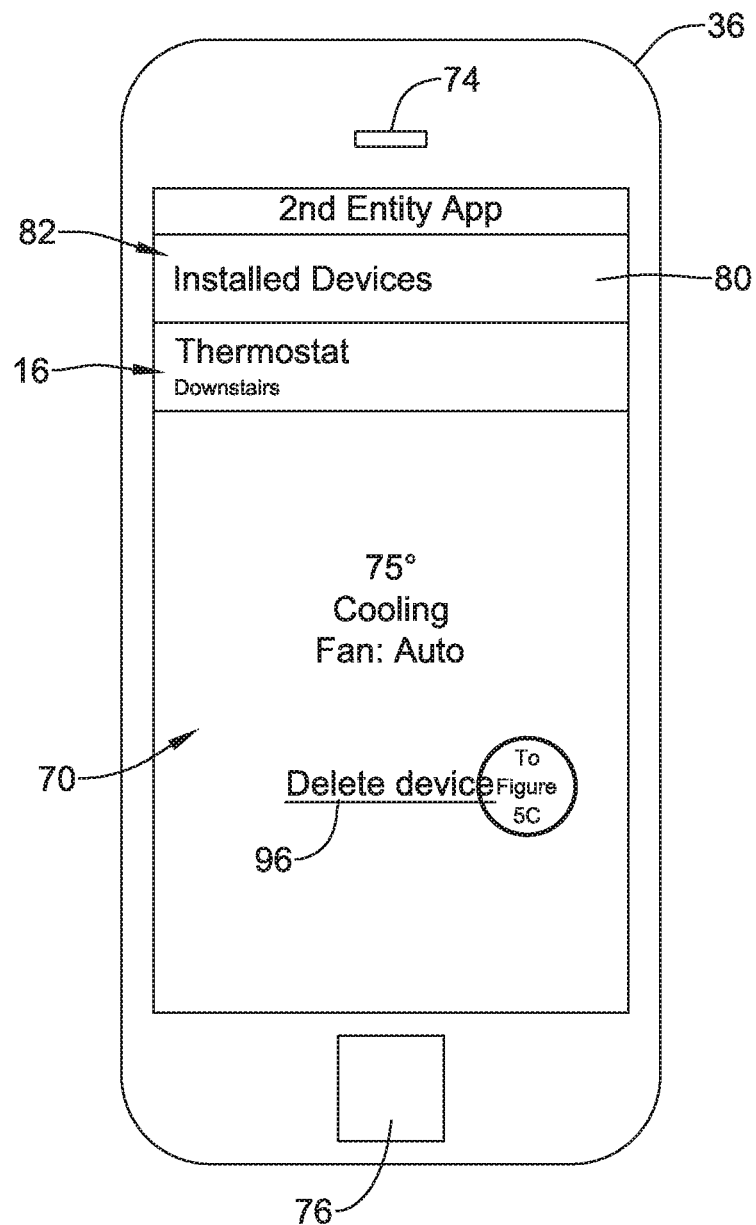
Figure 5C:
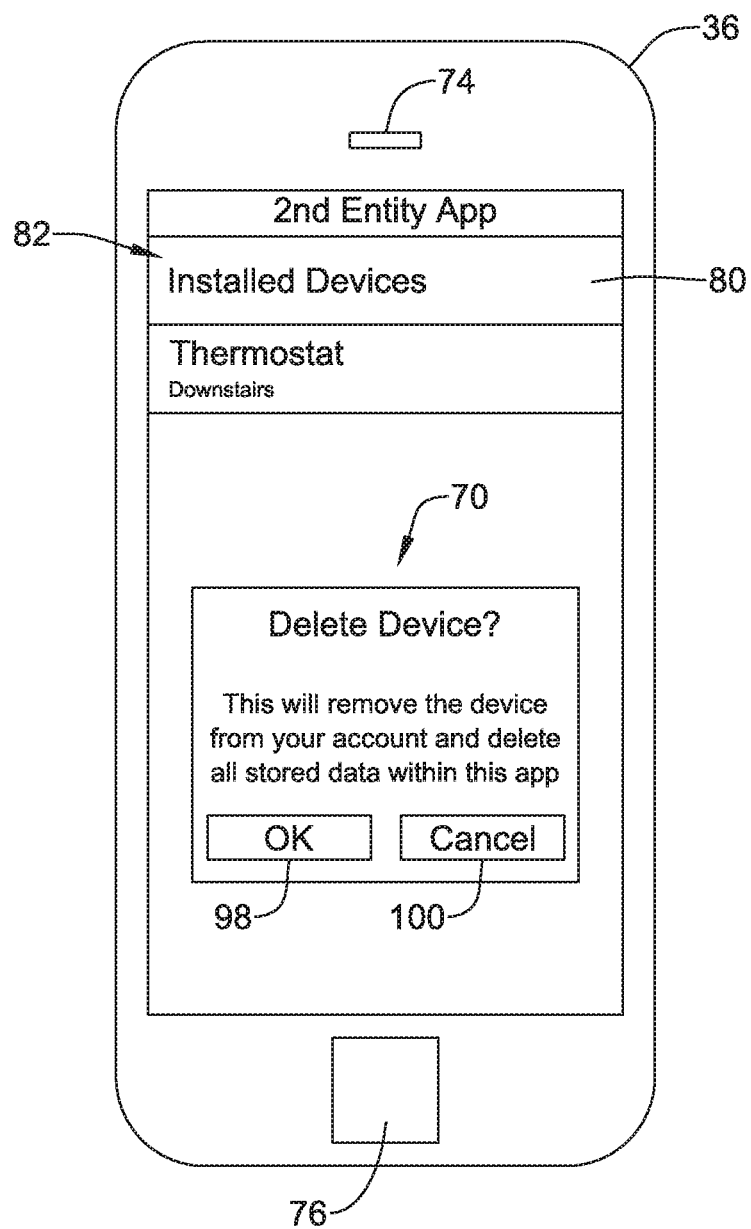

FIGS. 5A-5C depict screens 70 of an application program code of the second entity 34 that may be implemented on a mobile device 36 or other computing device. As shown in the screen 70 of FIG. 5A, a device list may list a user's network connected devices 16 that may be interacted with through the second entity 34. To remove a network connected device 16 from the second entity 34, a user may select from the list of network connected devices 16 in screen 70 the network connected device(s) 16 that is to be removed.

FIG. 5B may depict an overview of the selected network connected devices 16 for monitoring and/or controlling the selected network connected device 16. In some cases, the screen 70 of FIG. 5B may include a DELETE DEVICE link or button 96. If a user desires to remove access to the selected network connected device 16 from the second entity, the user may select the DELETE DEVICE link or button 96 to initiate the deleting/removing process.

FIG. 5C may depict a screen 70 with a delete confirmation. The delete confirmation may confirm a user wishes to delete the network connected device 16 from the user's account with the second entity 34. In one instance, the delete confirmation may recite "Delete Device? This will remove the device from your account and delete all stored data within this app". Then, to confirm the deletion of the network connected device 16, the user may be asked to select an OK button 98. After the OK button 98 is selected, a request may be received at the server 12 of the first entity 32 from the second entity 34 and the server 12 may be configured to remove access (e.g., monitoring access and/or control access) to the selected network connected device 16. If a user changes its mind, the user may select a CANCEL button 100 and the selected network connected device will not be deleted. Although FIG. 5C depicts an example delete confirmation, other or no delete confirmation screens may be utilized, as desired.

Additionally, or alternatively, a user may be able to initiate a request to delete/remove access to a user account of the first entity 32 from the second entity. Once the request has been initiated and received at the first entity 32, the server 12 may be configured to remove access to the user's user account with the first entity 32.

As referred to above, a user may want to remove a user account with a first entity 32 from association with its user account with a second entity 34. As such, removing a user account may be effected through the second entity 34 (e.g., through an interface of an application program code) and/or through the first entity 32. FIGS. 6A-6D depict removal of a user account for a first entity 32 from association with a second entity 34 through interacting with the first entity 32.

Figure 6A:
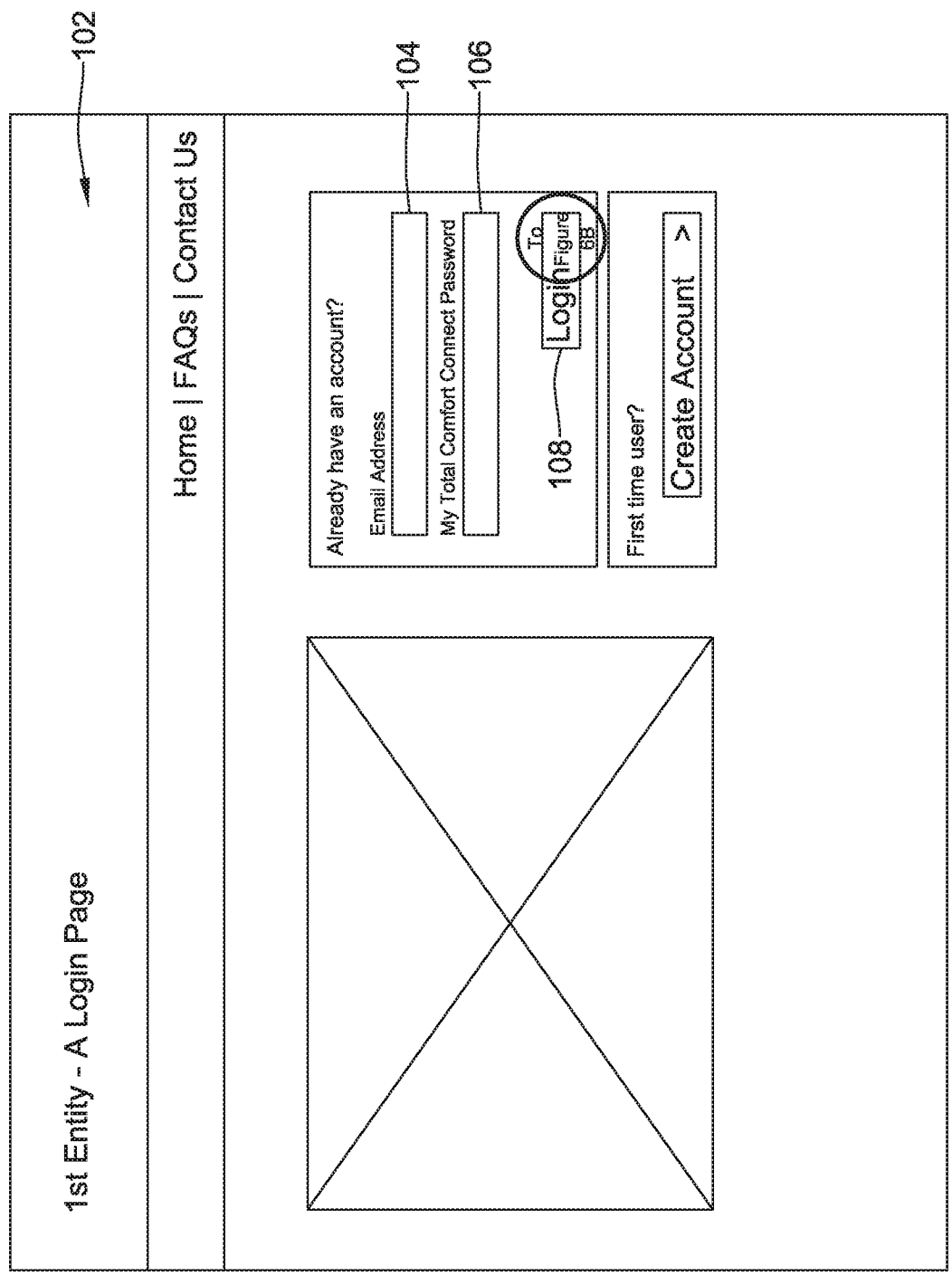
FIGS. 6A-6D are schematic diagrams of an illustrative example of interacting with an interface over the system of FIG. 2.

FIG. 6A depicts an illustrative user account login page 102 for a first entity 32. The login page 102 may be a screen on a webpage and/or a screen of an interface for an application program code. The login page 102 may include a box 104 for entering a user name/email address associated with the user account of the first entity and a box 106 for entering a password associated with the user name/email address. Once the user name/email address and associated password are entered in the respective boxes 104, 106, a user may select or press a LOGIN button 108 to advance to an ACCOUNT page 110.

Figure 6B:
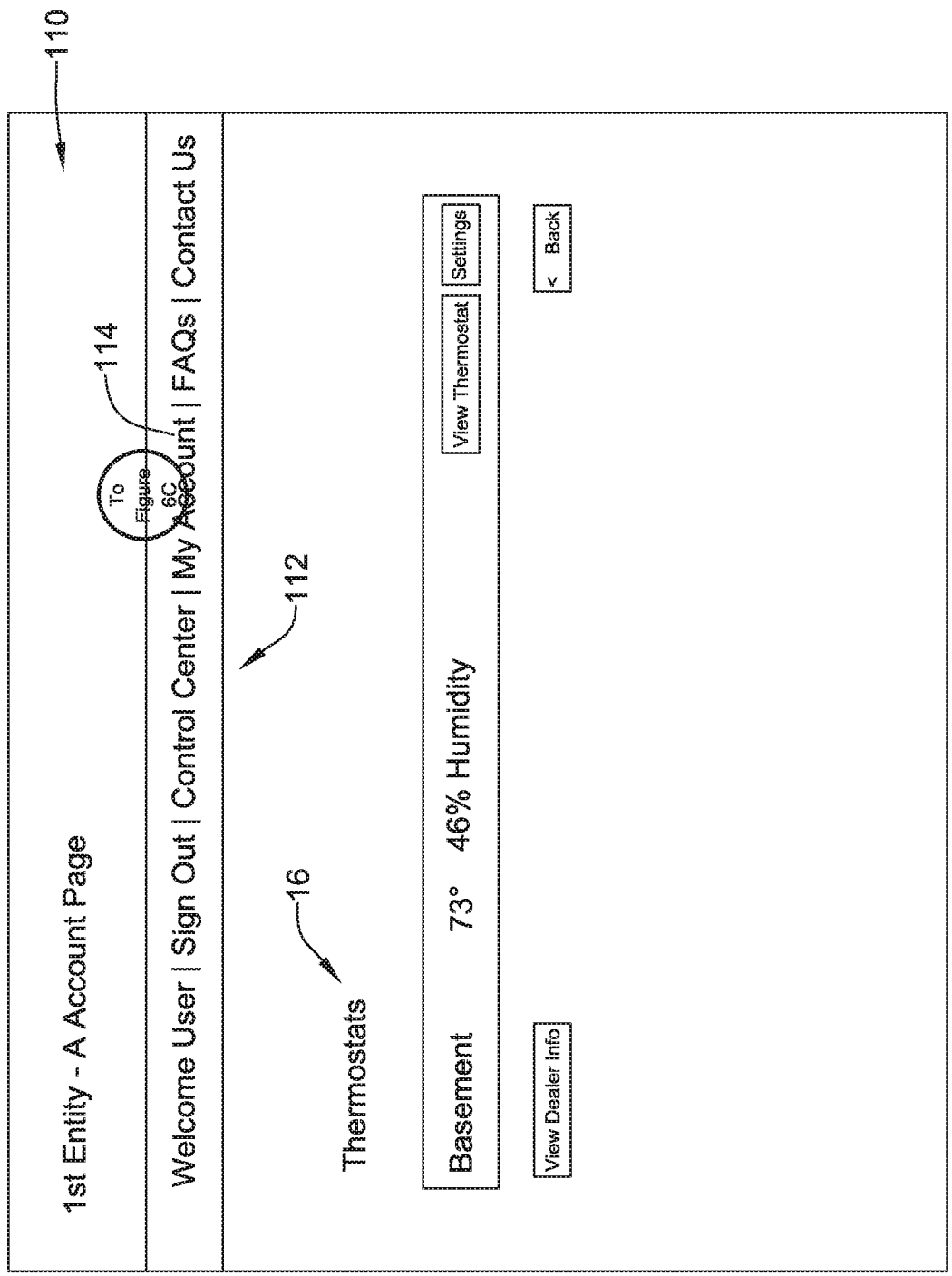

The ACCOUNT page 110 may be shown in FIG. 6B. On page 110, a user may be able to view status information concerning its network connected devices 16 and select various buttons to view further information of and/or control the network connected device 16. A toolbar 112 with one or more links or buttons may be displayed on ACCOUNT page 110. The toolbar 112 may be configured such that a user may select one or more buttons to go to a different page associated with the user's user account. In one example, a user may select the MY ACCOUNT link or button 114 or other similar link or button to advance to a page providing details of the user's account with the first entity 32. In some cases, such details may include information of second entities 34 that may have access to one or more of the user's network connected devices 16.

Figure 6C:
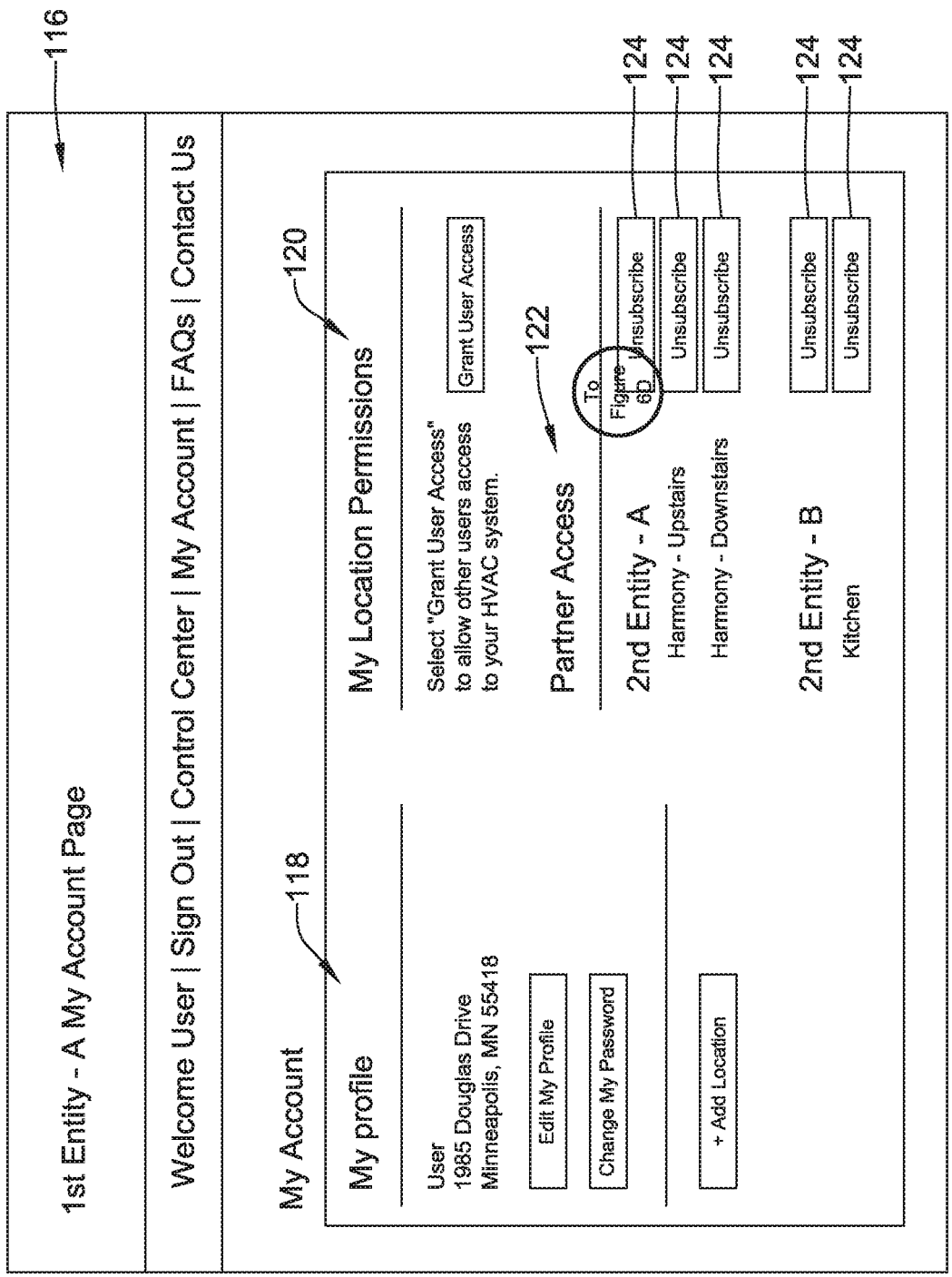

FIG. 6C depicts a user's MY ACCOUNT page 116. In one illustrative example, the MY ACCOUNT page 116 may include a profile section 118, an add permissions for access to network connected device 16 section 120, and a partner access section 122. From the partner access section 122, a user may view a list of second entities 34 (e.g., Second Entity—A and Second Entity—B) that have access permissions for interacting with a user's network connected devices 16. Additionally, or alternatively, in the partner access section 122 a user may be able to unsubscribe from a second entity 34 and/or unsubscribe individual devices from the second entity 34. As shown in FIG. 6C, a user may unsubscribe from a second entity 34 by selecting an UNSUBSCRIBE button 124. In some instances, unsubscribing from a second entity will remove access permission from the second entity 34 for all or a predetermined amount of network connected devices 16 that are associated with the second entity 34.

Figure 6D:
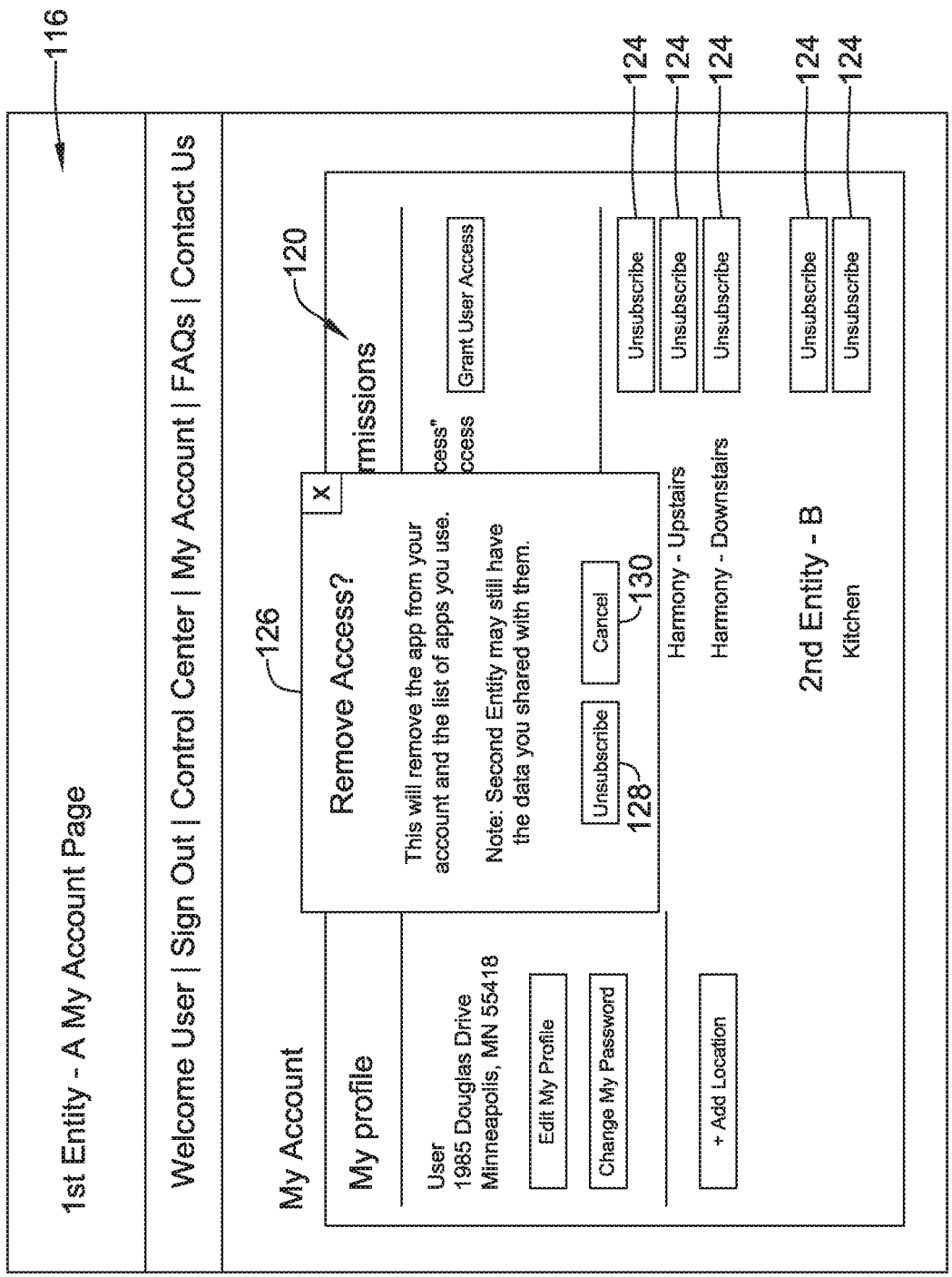

FIG. 6D depicts an unsubscribe confirmation screen 126. The unsubscribe confirmation page 126 may confirm a user wishes to unsubscribe its user account with the first entity 32 from the second entity 34. In one instance, the unsubscribe confirmation page 126 may recite "This will remove the app from your account and the list of apps you use. Note: second entity may still have the data you shared with them". Then, to confirm, the user may be asked to select an UNSUBSCRIBE button 128. Once the user provides the confirmation, the server 12 of the first entity 32 may remove access to the user's user account by the second entity. If a user changes its mind, the user may select a CANCEL button 130. Although FIG. 6D may depict an example unsubscribe confirmation page, other or no unsubscribe confirmation screens may be utilized, as desired.

Figure 7:
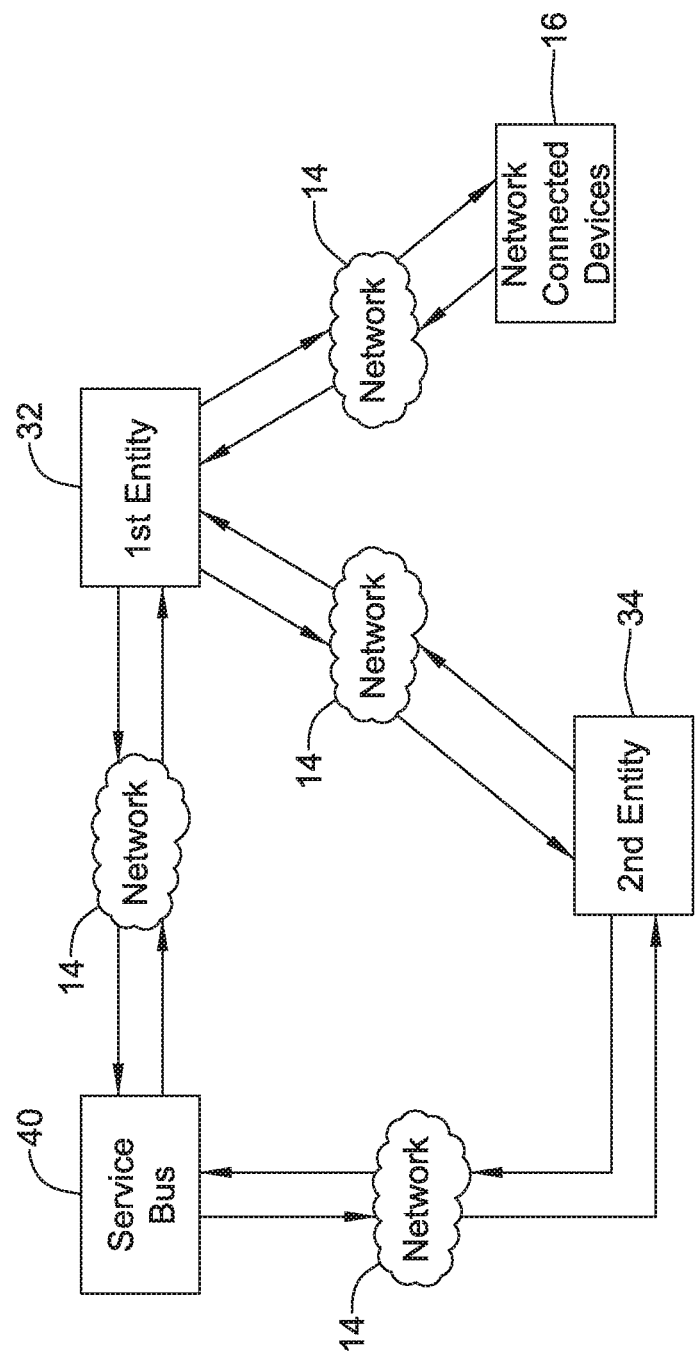
FIG. 7 is a schematic diagram of an illustrative example system incorporating communication with a service bus, a second entity, and network connected devices.

FIG. 7 depicts an illustrative communication flow over network 14 between the network connected devices 16, the first entity 32, and the second entity 34. As shown in FIG. 7, a service bus 40 may be utilized to facilitate communication between the first entity 32 and the second entity 34. The service bus 40 may facilitate mass transfer of data to the second entity 34 and scalability over time as more and more users have network connected device 16 and utilize second entities 34 for monitoring and/or controlling their network connected devices 16. As shown in FIG. 7, the second entity 34 may communicate with the first entity 32 through the service bus 40 or directly with the first entity. In instances where the second entity 34 may communicate directly with the first entity 32, the communication may be through an API on the server 12 and/or in an application program code of the second entity 34. In some cases, the service bus 40 may be configured by the first entity 32 to allow only one-way communication (e.g., transfer of data) through the service bus 40 and control commands for network connected devices may be sent directly from the second entity 34 (e.g., a wireless device (e.g., mobile device 36) running an application program of the second entity 34) to the first entity 32 through an API, for example.

A service bus 40 may be a service provided by an entity separate from the first entity 32 and/or the second entity 34 that may facilitate data transfer from the first entity 32 to the second entity 34. The service bus 40 may be configured on servers of the separate entity, where the servers may be configured to communicate with network 14. An example service bus 40 may be the Azure Service Bus offered by Microsoft®.

Illustratively, a service bus 40 may be set up by the first entity 32 defining and configuring some or all interactions to be had with the service bus 40. Then, second entities 34 may setup a service bus account and provide the first entity 32 their connection string, where a connection string identifies their service bus account. Once the first entity 32 has the second entity's connection string, the first entity 32 may authorize the second entity to receive data through the service bus. In some cases, oAuth may be utilized for authenticating the second entity 34.

Figure 8:
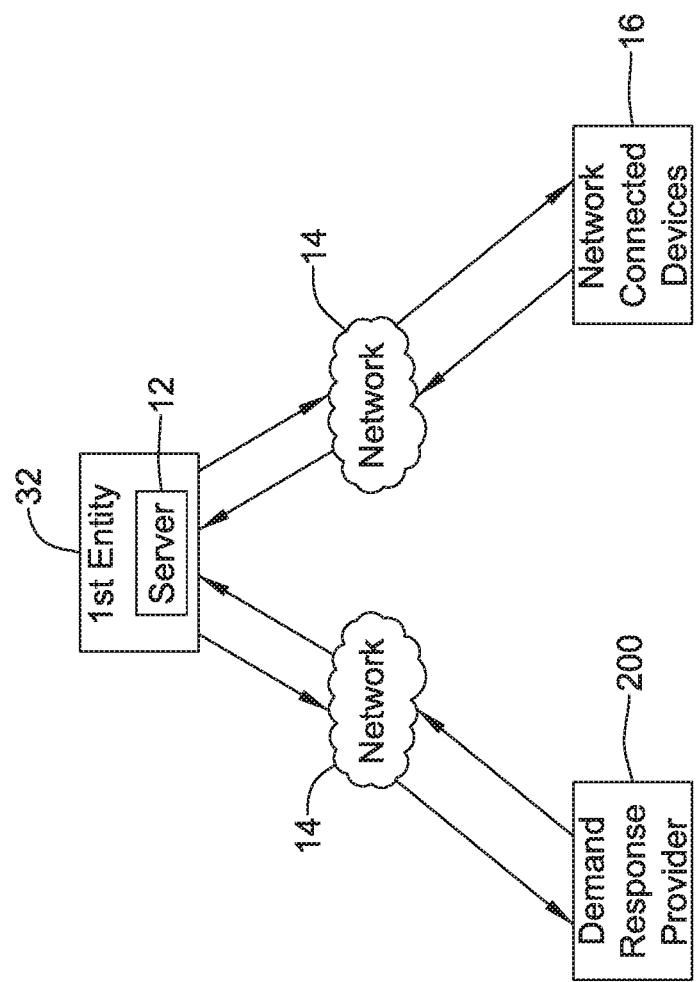
FIG. 8 is a schematic diagram of an illustrative example system incorporating communication with a demand response provider and network connected devices.

FIG. 8 depicts a communication system over the network 14 between network connected devices 16, a first entity 32 having a server 12, and a demand response provider 200. A demand response provider 200 may be an entity (e.g., a second entity 34 or an entity separate from the second entity 34 that may or may not communicate with the second entity 34) that controls many network connected devices 16 to affect power demand and/or for other purposes. Example demand response providers 200 may be utility companies or third parties interacting with a utility. Demand response providers 200 may enroll user accounts and/or network connected devices 16 with a demand response program to control associated network connected devices 16.

Figure 9:
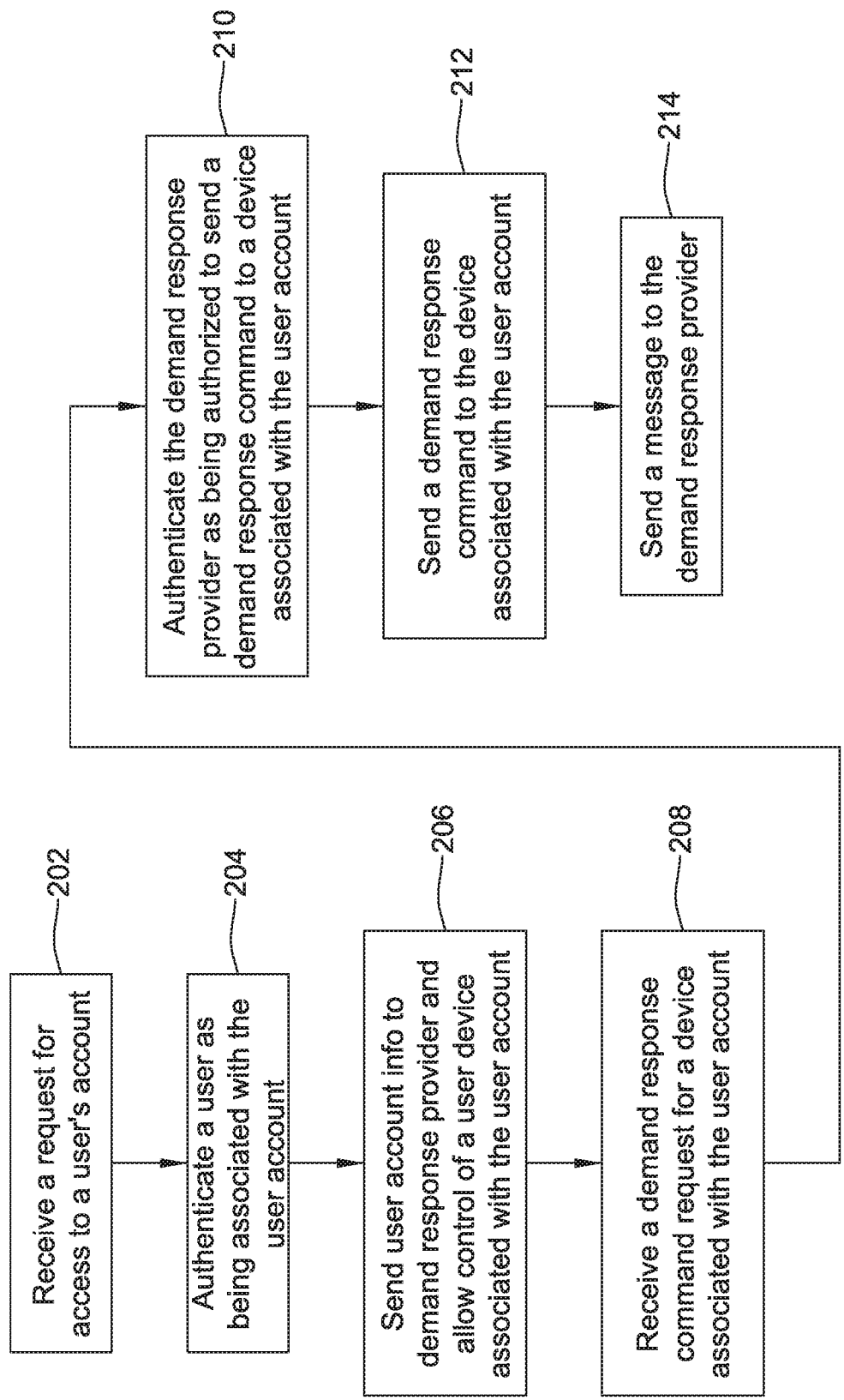
FIG. 9 is a schematic flow diagram of an illustrative example approach of using the system of FIG. 8.

In one example of a demand response provider 200, the demand response provider 200 may be a third party interacting with a utility. In the example, the demand response provider 200 may have a plurality of network connected devices 16 enrolled in a demand response program to adjust demand for power from the utility, where the network connected devices 16 may be building automation devices (e.g., thermostats, heating, ventilation and air condition (HVAC) components, and so forth). The demand response program may automatically adjust power consumption loads of the building automation devices 16 according to agreements between, and needs of, the utility and a user associated with the building automation devices, FIG. 9 is a flow diagram of an illustrative system of communicating with a demand response program. At box 202, the server 12 of the first entity 32 may receive a request from the demand response provider 200 for access to a user account of the first entity 32. In some cases, the user account may be stored in a user device database 30 in the server 12. In one example, the request from the demand response provider 200 may be initiated by a user associated with the user account. The user may initiate the request from an application program (e.g., with web or mobile application) of the demand response provider 200 and the received request may include user identifiable/authentication information, such that the server 12 may authenticate the user as being associated with the user account. Once the server 12 reviews the user identifiable/authentication information, at box 204 the server 12 may authenticate the user as being associated with the user account at the first entity 32. In some cases, the server may utilize oAuth to authenticate the user without the user having to give its first entity password to the demand response provider 200.

At box 206, once the user has been authenticated, the server 12 may send user account information to the demand response provider 200 and allow control of one or more devices associated with the user account via the demand response provider 200. The user account information (e.g., information relating to network connected devices 16, and so on) received at the demand response provider 200 may be saved for future reference and use in preparing demand response programs.

The server 12 may assign the demand response provider 200 to the user account of the first entity 32 and/or to one or more network connected devices 16 associated with the user account, where the one or more network connected devices 16 may be selected by the user, the demand response provider 200, and/or the first entity 32. In one example, the user account information sent to the demand response provider 200 may include a list of network connected devices 16 associated with the user account (e.g., a list of network connected devices 16 located in a single geographical location or a list with network connected devices located at or separated by different geographical locations). A user may select and the server 12 of the first entity 32 may receive from the demand response provider 200 (e.g., via the selection by the user) a selected one or more devices on the list to control with a demand response program of the demand response provider 200. Alternatively, or in addition, the demand response provider 200 may select without direct input (e.g., a direct selection of a network connected device 16) from a user one or more network connected devices on the list to control with a demand response program based on one or more criteria (e.g., geographical location, energy use history, and so forth) of a demand response program.

In some cases, the server 12 may review the network connected devices 16 associated with the user account of the first entity 32 for which access is granted to the demand response provider 200 to confirm that the network control devices 16 are not being controlled by one or more other demand response providers 200. That is, the server 12 may ensure that at most one and only one demand response provider is assigned to and/or associated with a user account of the first entity 32 and/or one or more network connected devices 16 associated with the user account of the first entity 32. Multiple demand response providers 200 controlling a single network connected device 16 may cause control signal/command conflicts.

At box 208 of FIG. 9, the server 12 of the first entity 32 may receive a demand response command request from the demand response provider 200 for one or more devices associated with the user account of the first entity. The server 12 of the first entity 32, at box 210, may authenticate the demand response provider 200 as being an authorized demand response provider for the first entity 32 and/or as being authorized to send a demand response command to the one or more network connected devices 16 associated with the user account of the first entity 32. Once the server 12 confirms the demand response provider 200 is authorized to send commands to the network connected devices 16 of a user's user account, at box 212 the server 12 may send a demand response command associated with the demand response command request to one or more network connected devices 16 associated with the user account and associated with the demand response command request. In some cases, sending a command to one or more network connected devices may include or be after translating the demand response command request in to a command that will be understandable by the network connected device 16.

At box 214 of FIG. 9, the server 12 may create and/or send a message to the demand response provider 200 regarding the demand response command request. In some cases, the messages may indicate the demand response command request was approved, the demand response command request was denied, why the demand response command request was approved/denied, a demand response command was sent to the network connected device(s) 16, the network connected device(s) 16 implemented the demand response command, one or more network connected devices 16 did not implement the demand response command, and/or one or more other indication relating to the demand response command request.

Similar to as discussed above with respect to the first entity 32 and the second entity 34, the server 12 may be configured to remove control access from the demand response provider 200 for a user's user account and/or for selected network connected devices 16 in response to receiving a request to remove user account and/or device access from the demand response provider 200. The request to remove access to the user's network connected devices 16 and/or user account may be initiated through a portal (e.g., website, mobile application/application program code, and so on) of the demand response provider 200 and/or through a port of the first entity, similar to or different from as discussed with respect to FIGS. 5A-5C and FIGS. 6A-6D.

Figure 10:
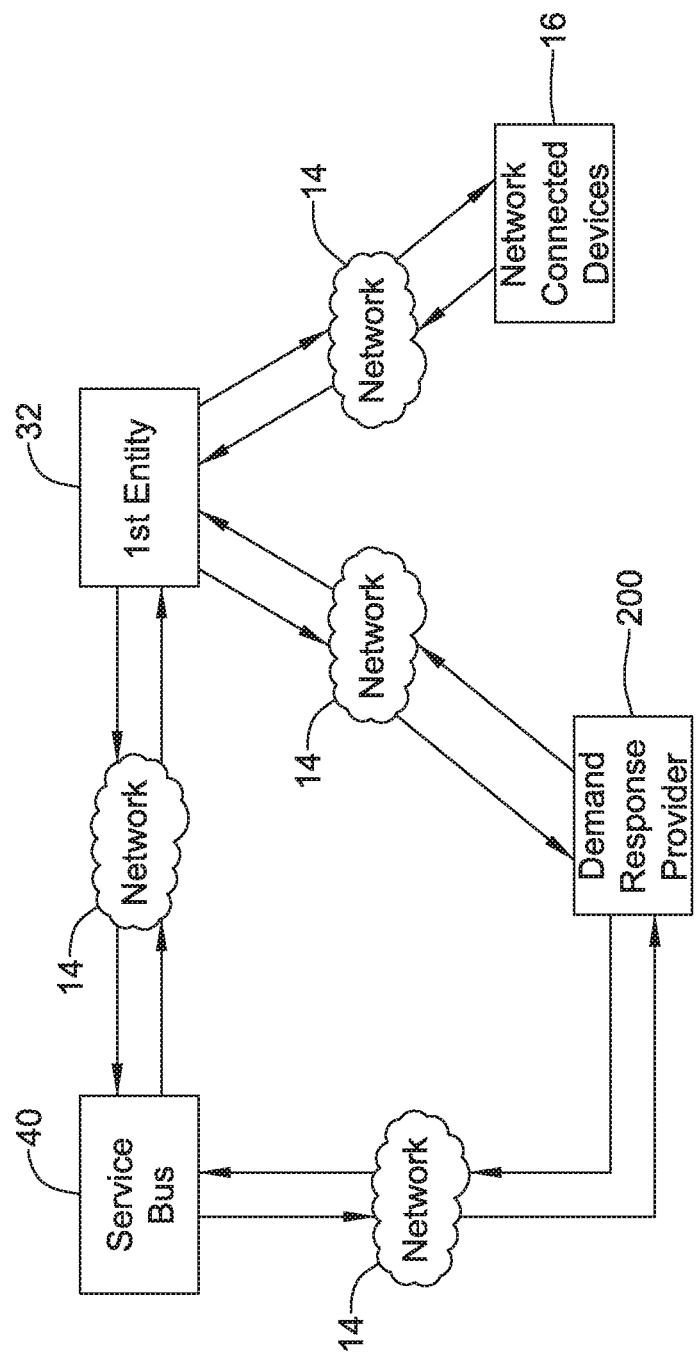
FIG. 10 is a schematic flow diagram of an illustrative example system incorporating communication with a service bus, a demand response provider, and network connected devices.

FIG. 10 depicts an illustrative communication flow over network 14 between the network connected devices 16, the first entity 32, and the demand response provider 200. As shown in FIG. 10, a service bus 40 (e.g., similar to the service bus 40 discussed above with respect to FIG. 7) may be utilized to facilitate communication between the first entity 32 and the demand response provider 200. The service bus 40 may facilitate mass transfer of data to the second entity 34 and scalability over time as more and more users have network connected device 16 and utilize demand response providers 200 for controlling their network connected devices 16 according to a demand response program. As shown in FIG. 10, the demand response provider 200 may communicate with the first entity 32 through the service bus 40 or directly with the first entity 32. In instances where the demand response provider 200 may communicate directly with the first entity 32, the communication may be through an API on the server 12 and/or in an application program code of the demand response provider 200. In some cases, the service bus 40 may be configured by the first entity 32 to allow only one-way communication (e.g., transfer of data) through the service bus 40 and control commands for network connected devices 16 may be sent directly (e.g., without use of the service bus 40) from the demand response provider 200 to the first entity 32.

The demand response provider 200 may receive the messages created and/or sent by the first entity 32 via the service bus 40 acting as an intermediary between the server 12 and the demand response provider 200. Alternatively, the server 12 may be configured to create and/or send the message directly (e.g., without sending the message through the service bus 40) to the demand response provider via an API connecting the first entity 32 with the demand response provider 200. Alternatively, or in addition, the demand response provider 200 may be configured to continuously or periodically (e.g. at set time intervals such as every thirty seconds, every minute, every ten minutes, and so on; at a time period or intervals after sending a demand response command request; and/or one or more other periodic times) check for, and server 12 may continuously or periodically receive those checks, for messages from the first entity 32.

A recap may be provided in the following. A system for controlling access to one or more network connected devices may incorporate a server having a processor and a memory in communication with the processor. The memory may store one or more databases, including, but not limited to, a user device database of a first entity. The server may be configured to receive a request from a second entity for access to a user account stored in the user device database from a user associated with the user account in the user device database. The server may be further configured to authenticate the user as being associated with the user account, grant access to the user account, and send user account information to the second entity and allow control of one or more devices associated with the user account via user interactions with the second entity.

The control of one or more devices associated with the user account may allow for viewing information of one or more devices associated with user account via the second entity. In one example, the control of one or more devices associated with user account may allow for viewing a current status of the one or more devices via the second entity.

The control of one or more devices associated with the user account may allow for modifying operation of the one or more devices associated with the user account via the second entity. In one example, the control of one or more devices associated with the user account may allow for changing a set point of one or more devices associated with the user account via the second entity.

The user account information sent to the second entity may include a list of the devices associated with the user account. The server may be configured to receive from a user a selection of one or more devices on the list to control through the second entity.

The devices included on the list may include a device located in a different geographical location than a geographical location of one or more other devices.

The devices included on the list may include devices having a connection to an internet and devices not connected to the internet.

The server may be configured to remove control access to a selected device by the second entity. The removal of control access may be in response to receiving a request from the user via the second entity.

The server may be configured to remove access to the user account by the second entity. The removal of access may be in response to receiving a request from the user via the second entity.

The server may be configured to remove access to the user account by the second entity. The removal of access may be in response to receiving a request from the user via the first entity.

An approach for accessing one or more building control devices through a first entity may be implemented via a computer readable medium having stored thereon in a non-transitory state a program code for use by a wireless device connectable to a network, where the program code may cause the wireless device to execute the approach. The approach may incorporate receiving a request for access to a user's building control device through a second entity from a user of the wireless device and receiving user authentication information from the user of the wireless device. The approach may further include sending a request for access to the user's building control device from the second entity to a first entity. In the approach, the first entity may control remote access to the user's device and the request for access to the user's building control device may include the received user authentication information.

The request for access to the user's building control device through a second entity may be received as a request for access through the second entity to an account of the user with the first entity.

The account of the user with the first entity may include account information. In one example, the account information may include a list of all building control devices of the user that are associated with the first entity.

After receiving access to one or more building control devices in the list of all building control devices of a user that are associated with the first entity, the executed approach may include further steps. In one example, the executed method may incorporate deleting the one or more building control devices associated with the first entity from a profile of the user with the second entity in response to receiving an indication from the first entity that access to the building control devices of the user's account has been terminated.

The executed approach may incorporate opening a user interface screen of the wireless device in response to receiving access through the second entity to the user's account with the first entity. The user interface screen may display a list of all building control devices of a user that are associated with the first entity.

The executed approach may incorporate receiving a selection of the user's building control device listed on the displayed list of all building control devices of the user that are associated with the first entity. Further, the executed approach may provide control access through the second entity to the user's selected building control device.

The executed approach may incorporate receiving a request from the user via the wireless device to the second entity for canceling control access through the second entity to the user's selected building control device. Further, the executed approach may incorporate sending a request from the second entity to the first entity to cancel control access through the second entity to the user's selected building control device.

An approach for providing access to one or more building control devices may incorporate receiving at a server a request from a second entity for access to a user account for a first entity stored in a user device database in the server. A user associated with the user account in the user device database may initiate the request. The approach may include authenticating at the server the user as being associated with the user account and granting access through the second entity to the user account of the first entity. Further, user account information may be sent to the second entity to allow control of one or more devices associated with the user account via user interactions with the second entity.

The sending of user account information to the second entity may include sending a list of building control devices associated with the user account. The approach may incorporate receiving at the server a selection via the second entity of one or more devices on the list to control through user interaction with the second entity.

The approach may incorporate removing access to a user account by the second entity in response to receiving a request at the server from the user via the second entity.

The approach may incorporate removing access to a user account by the second entity in response to receiving a request from the user via the first entity.

A system for demand response program control of one or more building control devices may incorporate a server having a processor and memory in communication with the processor, the memory storing a user device database of a first entity. The server may be configured to receive a request from a demand response provider for access to a user account stored in the user device database. The request may be initiated by a user associated with the user account in the user device database. The server may be further configured to authenticate the user as being associated with the user account, grant access to the user account, and send user account information to the demand response provider and allow control of one or more devices associated with the user account via the demand response provider.

The server of the system may be configured to receive a demand response command request from the demand response provider for one or more devices associated with the user account. Further, the serer may be configured to authenticate the demand response provider as being authorized to send a demand response command to the one or more devices associated with the user account.

The server of the system may be configured to send a demand response command associated with demand response command request to the one or more devices associated with the user account after the demand response provider is authenticated.

The server may be configured to send a message to the demand response provider. The message may be regarding the demand response command request.

The server may be configured to send the message to a service bus as an intermediary between the server and the demand response provider.

The server may be configured to send the message to the demand response provider. The message may be sent directly to the demand response provider via an application programming interface connection between the server and the demand response provider.

The server may be configured to assign the demand response provider to one or more devices associated with the user account. The assignment may be in response to the one or more devices associated with the user account being selected by the user.

The server may be configured to assign one and only one demand response provider to a device associated with the user account.

In the system, the user account may include a list of devices associated with the user account. The server of the system may be configured to receive from the demand response provider a selection of one or more devices on the list to control with a demand response program of the demand response provider.

The devices on the list may include a device located in a different geographical location than a geographical location of one or more other devices.

The server may be configured to remove control access from the demand response provider for a selected device. The removal of control access may be in response to receiving from the user a request to remove device access from the demand response provider.

The server may be configured to remove access to the user account by the demand response provider. The removal of access may be in response to receiving from the user a request to remove user account access for the demand response provider.

The one or more devices associated with the user account may be building automation devices.

An approach for accessing one or more building control devices through a first entity may be implemented via a computer readable medium having stored thereon in a non-transitory state a program code for use by a computing device connectable to a network, where the program code may cause the computing device to execute the approach. The approach may incorporate receiving from a user a request for access to a user's building control device through a demand response provider and receiving user authentication information from the user. Further, the approach may incorporate requesting from a first entity demand response program access via the demand response provider for the user's building control device. The first entity may control demand response program access to the user's device and the requesting may include requesting the first entity to authenticate that the user is associated with the user's building control device based, at least in part, on the user authentication information.

The approach may incorporate confirming that the user has been authenticated as being associated with the user's building control device.

The approach may incorporate receiving a demand response command request for the user's building control device via the demand response provider. Further, the approach may incorporate authenticating the demand response provider as being authorized to send a demand response command to the user's building control device.

After receiving access to the user's building control device, the approach may further incorporate additional steps. In one example, after receiving access to the user's building control device the approach may incorporate disassociating the demand response provider from association with the user's building control device in response to receiving an indication from the first entity that access to the building control device has been terminated.

An approach of providing access to one or more building control devices for enrollment in a demand response program may incorporate receiving at a server a request from a demand response provider for access to a user account for a first entity stored in a user device database in the server. The user associated with the user account in the user device database may initiate the request. The approach may further include authenticating at the server the user as being associated with the user account, granting access through the demand response provider to the user account of the first entity, and sending user account information to the demand response provider to allow enrollment of one or more devices associated with the user account in a demand response program. The approach may incorporate receiving a demand response command request for one or more devices associated with the user account and authenticating the demand response provider as being authorized to send a demand response command to the one or more devices associated with the user account.

The approach may further incorporate sending a demand response command associated with the demand response command request to the one or more devices associated with the user account once the demand response provider has been authenticated. The sent demand response command may be configured to change operation of the one or more devices associated with the user account.

In the approach, the server may be configured to associate one and only one demand response provider with the user account.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to incorporate all such variations and modifications.

What is claimed is:

1. A server for demand response program control of one or more building control devices, the server comprising:
   a processor implemented in circuitry; and
   a memory in communication with the processor, the memory storing a user device database of a first entity;
   wherein the processor is configured to:
      receive a request from a demand response provider for access to a user account stored in the user device database, wherein the request is initiated by a user through a user account with the demand response provider and the user is associated with the user account in the user device database, and wherein the demand response provider is separate from the first entity;
      authenticate the user as being associated with the user account in the user device database and grant access to the user account in the user device database;
      send, in response to authenticating the user, user account information to the demand response provider; and
      allow control of one or more devices associated with the user account in the user device database via a demand response program of the demand response provider, and
   wherein the demand response provider has a plurality of user accounts and enrolls devices associated with the plurality of user accounts in demand response programs to affect power demand.

2. The server of claim 1, wherein the processor is configured to:
   receive a demand response command request from the demand response provider for one or more devices associated with the user account in the user device database; and
   in response to receiving the demand response command request, authenticate the demand response provider as being authorized to send a demand response command request to the one or more devices associated with the user account in the user device database.

3. The server of claim 2,
   wherein the processor is configured to send a demand response command associated with demand response command request to the one or more devices associated with the user account in the user device database after the demand response provider is authenticated, and
   wherein the processor is configured to send the demand response command to the one or more devices to change an operation or setting of the one or more devices.

4. The server of claim 3, wherein the processor is configured to send a message to the demand response provider regarding the demand response command request.

5. The server of claim 4, wherein the processor is configured to send the message to a service bus as an intermediary between the server and the demand response provider.

6. The server of claim 4, wherein the processor is configured to send the message to the demand response provider via an application programming interface connection between the server and the demand response provider.

7. The server of claim 1, wherein the processor is configured to assign the demand response provider to one or more devices associated with the user account in the user device database in response to the one or more devices associated with the user account in the user device database being selected by the user.

8. The server of claim 1, wherein the processor is configured to assign one and only one demand response provider to a device associated with the user account in the user device database.

9. The server of claim 1, wherein:
the user account in the user device database includes a list of devices associated with the user account in the user device database; and
the processor is configured to receive from the demand response provider a selection of one or more devices on the list to control with a demand response program of the demand response provider.

10. The server of claim 9, wherein the devices on the list include a device located in a different geographical location than a geographical location of one or more other devices.

11. The server of claim 9, wherein the processor is configured to remove control access from the demand response provider for a selected device in response to receiving from the user a request to remove device access from the demand response provider.

12. The server of claim 1, wherein the processor is configured to remove access to the user account in the user device database by the demand response provider in response to receiving from the user a request to remove user account access for the demand response provider.

13. The server of claim 1, wherein one or more devices associated with the user account in the user device database are building automation devices.

14. A computer readable medium having stored thereon in a non-transitory state a program code for use by a computing device connectable to a network, the program code causing the computing device to execute a method for accessing one or more building control devices through a first entity, the method comprising:
receiving from a user a request for access to a user's building control device through a demand response provider, wherein the request for access is received by the computing device via a user account of the demand response provider, and wherein the demand response provider is separate from the first entity;
receiving user authentication information from the user;
requesting, from the first entity, demand response program access via the demand response provider for the user's building control device, where the first entity controls demand response program access to the user's building control device and requesting the demand response program access includes requesting the first entity to authenticate that the user is associated with the user's building control device based, at least in part, on the user authentication information,
wherein the demand response provider has a plurality of user accounts and enrolls devices associated with the plurality of user accounts in demand response programs to affect power demand.

15. The computer readable medium of claim 14, wherein the executed method further comprises confirming that the user has been authenticated as being associated with the user's building control device.

16. The computer readable medium of claim 14, wherein the executed method further comprises:
receiving a demand response command request for the user's building control device via the demand response provider; and
authenticating the demand response provider as being authorized to send a demand response command to the user's building control device.

17. The computer readable medium of claim 14, wherein after receiving access to the user's building control device, the executed method further comprises disassociating the demand response provider from association with the user's building control device in response to receiving an indication from the first entity that access to the building control device has been terminated.

18. A method of providing access to one or more building control devices for enrollment in a demand response program, the method comprising:
receiving at a server a request from a demand response provider for access to a user account stored in a user device database in the server, wherein a user associated with the user account in the user device database initiates the request via a user account associated with the demand response provider, and wherein the demand response provider is separate from the first entity;
authenticating at the server the user as being associated with the user account in the user device database;
granting access through the demand response provider to the user account in the user device database in response to authenticating the user;
sending user account information to the demand response provider to allow enrollment in a demand response program of one or more devices associated with the user account in the user device database;
receiving a demand response command request as part of the demand response program for one or more devices associated with the user account in the user device database;
authenticating the demand response provider as being authorized to send a demand response command to the one or more devices associated with the user account in the user device database in response to receiving the demand response command request; and
wherein the demand response provider has a plurality of user accounts and enrolls devices associated with the plurality of user accounts in demand response programs to affect power demand.

19. The method of claim 18, further comprising sending a demand response command associated with the demand response command request to the one or more devices associated with the user account in the user device database once the demand response provider has been authenticated, wherein the sent demand response command is configured to change operation of the one or more devices associated with the user account.

20. The method of claim 18, further comprising associating one and only one demand response provider with the user account in the user device database.

* * * * *